United States Patent
Kremin et al.

(10) Patent No.: US 10,068,121 B2
(45) Date of Patent: Sep. 4, 2018

(54) BASELINE COMPENSATION FOR CAPACITIVE SENSING

(71) Applicant: Cypress Semiconductor Corporation, San Jose, CA (US)

(72) Inventors: Viktor Kremin, Lviv (UA); Kaveh Hosseini, Cork (IE); Roman Ogirko, Lviv (UA); Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/084,363

(22) Filed: Mar. 29, 2016

(65) Prior Publication Data

US 2017/0061188 A1 Mar. 2, 2017

Related U.S. Application Data

(60) Provisional application No. 62/212,320, filed on Aug. 31, 2015, provisional application No. 62/280,237, filed on Jan. 19, 2016.

(51) Int. Cl.
| | |
|---|---|
| *G06F 3/045* | (2006.01) |
| *G06K 9/00* | (2006.01) |
| *G06F 3/044* | (2006.01) |
| *G06F 3/041* | (2006.01) |

(52) U.S. Cl.
CPC .......... *G06K 9/0002* (2013.01); *G06F 3/044* (2013.01); *G06F 3/0418* (2013.01)

(58) Field of Classification Search
CPC ...... G06K 9/0002; G06F 3/0418; G06F 3/044

USPC .................................................. 345/173–179
See application file for complete search history.

(56) References Cited

U.S. PATENT DOCUMENTS

| | | | |
|---|---|---|---|
| 6,108,438 A * | 8/2000 | Bird | G06K 9/0002 |
| | | | 250/556 |
| 8,093,914 B2 | 1/2012 | Maharyta et al. | |
| 8,462,135 B1 | 6/2013 | Xiao et al. | |
| 8,487,639 B1 * | 7/2013 | Walsh | G06F 3/044 |
| | | | 324/658 |
| 9,019,220 B1 * | 4/2015 | Klein | G06F 3/044 |
| | | | 345/173 |
| 9,151,792 B1 | 10/2015 | Kremin et al. | |
| 2008/0061800 A1 * | 3/2008 | Reynolds | G01R 27/2605 |
| | | | 324/678 |
| 2008/0158178 A1 | 7/2008 | Hotelling et al. | |
| 2009/0153152 A1 * | 6/2009 | Maharyta | G01R 27/2605 |
| | | | 324/684 |
| 2011/0242050 A1 | 10/2011 | Byun et al. | |
| 2012/0306802 A1 | 12/2012 | McCracken | |

(Continued)

OTHER PUBLICATIONS

International Search Report for International Application No. PCT/US2016/038484 dated Jul. 15, 2016; 7 pages.

(Continued)

*Primary Examiner* — Mark Edwards
(74) *Attorney, Agent, or Firm* — Lowenstein Sandler LLP

(57) ABSTRACT

A capacitance sensing circuit may include a charge to digital converter, coupled to a signal receiver channel, to receive a signal from a capacitive sense array. The capacitance sensing circuit may also include a baseline compensation signal generator, coupled to the signal receiver channel, to provide a baseline compensation signal in an opposite phase of the signal to the signal receiver channel.

20 Claims, 17 Drawing Sheets

(56) References Cited

U.S. PATENT DOCUMENTS

| | | | |
|---|---|---|---|
| 2015/0062074 A1* | 3/2015 | Wang | G06F 3/0416 345/174 |
| 2015/0161954 A1* | 6/2015 | Tokita | G06F 3/044 345/174 |
| 2015/0205438 A1 | 7/2015 | Kremin et al. | |

OTHER PUBLICATIONS

Written Opinion of the International Searching Authority for International Application No. PCT/US2016/038484 dated Jul. 15, 2016; 10 pages.

Davison, Burke, "Techniques for Robust Touch Sensing Design", Microchip Technology, Inc. AN1334, 2013; 30 pages.

Dr. M. Chandrasekar, et al., "Electronic Equipments Theory", Government of Tamilnadu Vocational Education, dated 2011; pp. 180-181.

Srinivasagam, Kannan, et al., "Differentiating Noise from Real Touch—The Key to Robust Capacitive Sensing", Cypress Semiconductor Corporation, dated Oct. 2010; 8 pages.

* cited by examiner

BASELINE COMPENSATION FOR CAPACITIVE SENSING

RELATED APPLICATIONS

This application claims the benefit of U.S. Provisional Application No. 62/212,320, filed on Aug. 31, 2015 and U.S. Provisional Application No. 62/280,237, filed on Jan. 19, 2016 the entire contents of which are incorporated by reference.

BACKGROUND

Capacitance sensing systems can sense electrical signals generated on electrodes that reflect changes in capacitance. Such changes in capacitance can indicate a touch event (e.g., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and other such devices. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground.

BRIEF DESCRIPTION OF THE DRAWINGS

The present disclosure is illustrated by way of example, and not of limitation, in the figures of the accompanying drawings in which.

DETAILED DESCRIPTION

Figure 1:
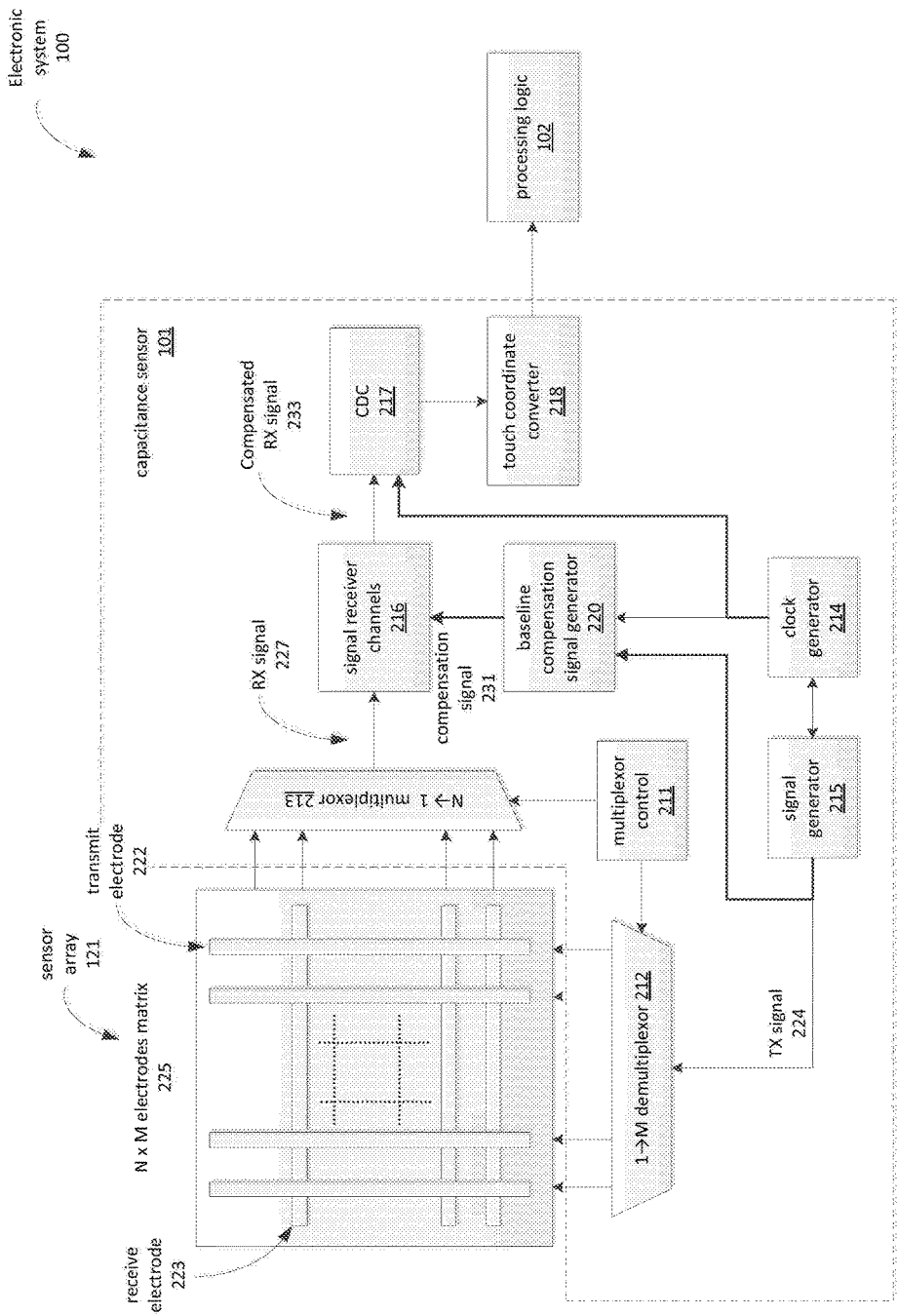
FIG. 1 is a block diagram illustrating a capacitive touch sensor array and a capacitance sensor that converts measured capacitances to coordinates according to an embodiment.

Aspects of the present disclosure relate to providing a baseline compensation signal to a signal receiver channel associated with a capacitive sense array. The baseline compensation signal may be injected as an opposite phase signal at the front of a charge to digital converter (CDC). In some embodiments, the baseline compensation signal may be provided through an RC circuit from an input signal to the capacitive sense array or may be generated by switching capacitor current sources. A capacitance sensor may use the baseline compensation signal to remove non-informative portions of a signal received on the signal receiver channel.

A capacitance sensor may provide an input signal to a capacitive sense array. A signal receiver channel may receive the signal from an output of the capacitive sense array to determine capacitance of one or more capacitive elements of the capacitive sense array. Depending on the received signal, the capacitance sensor may determine that the capacitive sense array has been touched.

In a capacitive touch sensor, a finger touch may change the input signal by only a small amount. For example, a finger touch may change the signal received by the approximately 5%. The part of the signal that does not change in response to a touch event is referred to as a baseline portion of the signal and does not provide information that is informative of whether there was a touch event. As a result, the available range of the capacitance sensor is dedicated to sensing the baseline portion (also referred to herein as non-informative portion) of the signal. For example, the majority of a signal output from a CDC may be indicative of the non-informative portion of the received signal.

In order to sense small changes in the received signal, some capacitance sensors may utilize high-resolution CDCs for sensing the received signal. However, high-resolution CDCs may be larger components that are not suitable for applications having size constraints. In addition, high-resolution CDCs may utilize more power and operate at slower speeds than alternative CDCs having lower resolutions. Some systems may incorporate low noise current sources driven by a pulse width modulation (PWM) signal. The current sources may compensate for the baseline signal, but introduce increased noise into the system that is unsuitable for low-level signal recognition such as hover detection or fingerprint recognition. For example, PWM driven current sources may introduce jitter and other noise that degrades overall capacitance sensor performance.

In order to improve performance, the capacitance sensor may compensate for the baseline portion of the received signal before the signal is received at the CDC. For example, a baseline compensation signal may be injected into the signal receiver channel before integration or amplification in the CDC. Providing the baseline compensation signal at the front of the CDC may reduce the dynamic range necessary for input signal circuits, may reduce the size of components used for input signal circuits, and may also reduce the power consumption of the input signal circuits.

In some embodiments, a baseline compensation signal may be generated and injected into the receiver signal channel using a resistor-capacitor (RC) circuit. An RC circuit, which may also be referred to as an RC network, is an electric circuit that includes one or more resistors and one or more capacitors driven by a voltage or current source. The RC circuit may be driven by the same input voltage that is applied to the capacitive sense array. The RC circuit may be driven by the inverse of the clock source used to provide an input signal to the capacitive sense array. Thus, the baseline compensation signal may be provided to the signal receiver channel in the opposite phase of the signal received from the capacitive sense array. In some embodiments, a single baseline compensation signal may be used for each of the signal receiver channels of the capacitive sense array. This may remove a significant portion of the baseline signal from each channel and may work well in capacitive sense arrays having small variations between sensor elements. In some embodiments, separate baseline compensation signals may be provided for individual signal receiver channels. This may allow the capacitance sensor to provide a baseline compensation signal calibrated to each signal receiver channel and account for variance among elements of the capacitive sense array. However, it may utilize additional space on an integrated circuit or additional power consumption. A hybrid approach may also be used. In a hybrid approach, a large baseline compensation signal may be provided from one source to each channel and individual compensation sources or calibration may provide compensation for individual signal receiver channels.

In some embodiments, the input signal applied to the capacitive sense array may be a differential input provided by a transmission signal generator 215, and the input received at the signal receiver channel may be a differential signal. Thus, the transmission applied to the capacitive sense array may include a negative and positive terminal, and the signal receiver channel may receive a signal from the capacitive sense array on a corresponding positive and negative terminal. In such embodiments, an RC circuit may attach opposite polarity electrodes of the differential input to provide a baseline compensation signal in opposite phase of the received signal. For example, an electrode providing a positive polarity of a transmission signal to a sensor array may be coupled through the RC circuit to an electrode receiving a negative polarity of the signal received from the sensor array. Additionally, an electrode providing a negative polarity of the transmission signal to the sensor array may be coupled through the RC circuit to an electrode receiving a positive polarity of the signal received from the sensor array In some embodiments, the baseline compensation signal may be generated by switching capacitor current sources. For example, series or bi-linear, switching-capacitor current sources (hereinafter referred to as "switching-capacitor current sources") may generate a baseline compensation signal in the opposite phase of a signal received by a signal receiver channel. The baseline compensation signal provided by the switching-capacitor current source may provide a low-noise compensation signal without jitter or other problematic noise. The switching-capacitor current sources may be calibrated in response to performance of a CDC. For example, if the CDC is outputting results near the top of its range, the baseline compensation signal provided before the CDC may be increased. Furthermore, if the CDC is outputting results near the bottom of its dynamic range, the baseline compensation signal provided before the CDC may be reduced.

In some embodiments, a baseline compensation signal may be generated by a current conveyer based on a common mode signal generated by multiple signal receiver channels. For example, a current conveyor may sum the signal input to CDCs on multiple signal receiver channels and remove the average or common mode signal from signals received from the capacitive sense array.

Aspects of the present disclosure may reduce the impact of ripples on a signal input to the capacitive sense array. For example, if the baseline compensation signal is driven by the input signal, a portion of the ripples may be removed during baseline compensation before the CDC. Overall signal-to-noise ratio may also be improved due to the signal processed by the CDC being calibrated to the dynamic range of the CDC. In addition, the accuracy, sensitivity, or resolution of the capacitance sensor may be improved without the use of high-resolution CDCs. Furthermore, the capacitance sensor may have better noise immunity due to having better sensing channel headroom to handle noisy inputs without saturation or clipping by integration or charge conversion circuits.

FIG. 1 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensor 101 through demultiplexer 212 and multiplexer 213.

Capacitance sensor 101 includes multiplexer control 211, demultiplexer 212 and multiplexer 213, clock generator 214, signal generator 215, one or more signal receiver channels 216, and charge to digital converter (CDC) 217. CDC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of sensor array 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different. For example, signal generator 215 may produce a square wave as TX signal 224 as discussed with reference to FIG. 4 below.

The output of signal generator 215 is connected with demultiplexer 212, which allows the TX signal 224 to be applied to any of the M transmit electrodes of sensor array 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to signal receiver channels 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional signal receiver channel 216. In configurations having a 1-to-1 correspondence of instances of signal receiver channel 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 received by the signal receiver channels 216 may receive an opposite phase baseline compensation signal ($V_{comp}$) 231 from baseline compensation signal generator 220. For example, the baseline compensation signal generator 220 may provide an opposite phase baseline compensation signal using an RC circuit, a switching capacitor current source, a current conveyor, or in other manners as described herein. The baseline compensation signal 231 may be injected into signal receiver channel 216 such that a compensated RX signal 233 is provided to the charge to digital converter 217. The compensated RX signal 233 may be rectified, filtered and converted to digital code by CDC 217. The CDC 217 may receive a clock signal generated by clock generator 214 to perform sensing synchronous with the signal input to the capacitive sensing array.

In some embodiments, the baseline compensation signal generator 220 may generate compensation signal 231 based on a reference voltage or reference signal. The baseline compensations signal generator 220 may then generate the compensation signal 231 based on the reference voltage or reference signal. For example, as shown in FIG. 1, the baseline compensation signal generator 220 may be operatively coupled to the signal generator 215. Thus, the baseline compensation signal generator 220 may receive the transmission signal 224 as a reference signal. Then, the baseline compensation signal generator may generate the compensation signal 231 based on the received transmission signal 224. Additional details of the baseline compensation signal generator 220 are described further below with reference to additional drawings.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, a system for tracking locations of contacts on a touch-sensing surface may determine a touch position for each of the contacts based on the capacitance measurements from the capacitive sensor array. In one embodiment, a capacitive touch-sensing system that is also capable of determining a magnitude of force applied to each of a plurality of contacts at a touch-sensing surface may be constructed from flexible materials, such as PMMA, and may have no shield between the capacitive sensor array and an LCD display panel. In such an embodiment, changes in capacitances of sensor elements may be caused by the displacement of the sensor elements closer to a VCOM plane of the LCD display panel.

Figure 2A:
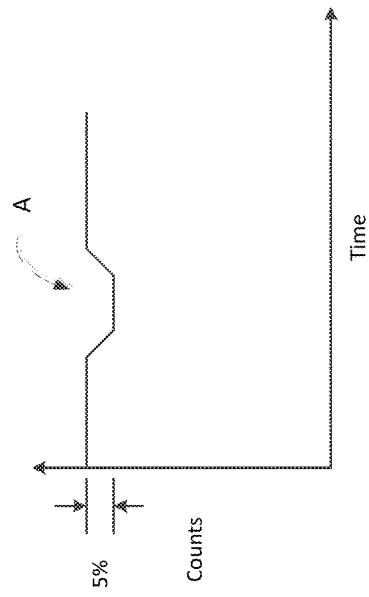
FIGS. 2A-2D are diagrams illustrating capacitance sensed by example embodiments of a touch sensor.
Figure 2C:
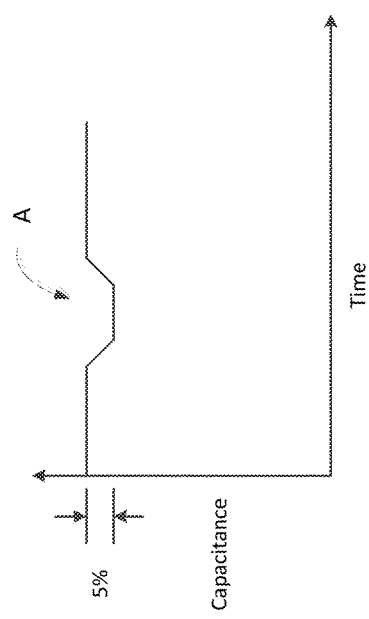
Figure 2B:
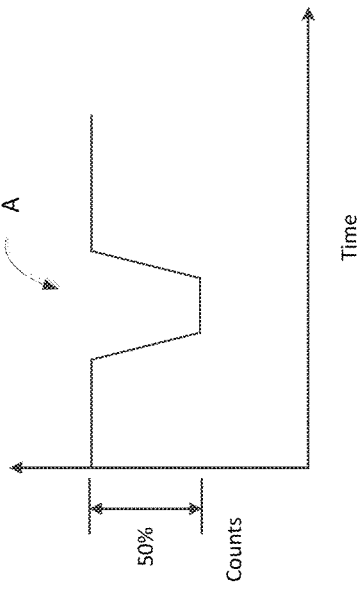

FIGS. 2A-2D depict graphs illustrating the impact of touch on the signals received and generated by components of a capacitance sensor. FIG. 2A depicts the capacitance sensed of an element of a capacitive sense array during a period of time. At time A, the element experiences a change in capacitance. The change in capacitance may be due to a touch from a finger, for instance. FIG. 2B depicts the corresponding effect on the counts sensed by a CDC. As shown in FIGS. 2A and 2B, a finger touch in a touch sensor or a finger image in a fingerprint reader, may produce only a small change in the input charge to a signal receiver channel. As an example, the Figures illustrate this change as 5%, however, in practice the change may be a different amount. The remaining portion of the signal received by the signal receiver channel may be non informative baseline charge. In some embodiments, the effect of baseline compensation may be larger in configurations having multiphase (more than one TX electrode is driven at same time) TX drive/multiphase RX sense (more than one RX sensor is connected to the receive channel at same time) modes with non-zero sum driving/sense sequences. In such cases, the non-informative amount of baseline charge, coming to the input stage of CDC is proportional to the product of the sums of the multi-TX/multi-RX sequences.

Figure 2D:
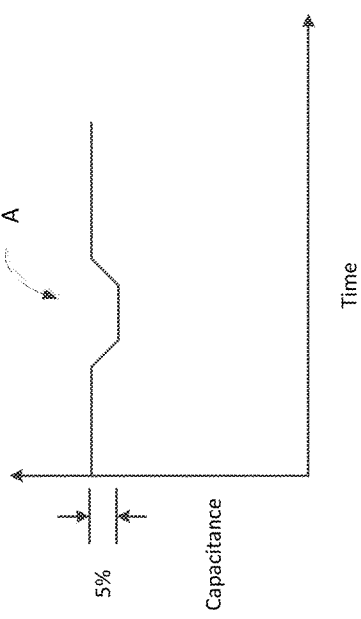

A large baseline component reduces the utility of amplifiers and the dynamic range of the CDC, as a signal change due to a finger ridge/valley presence takes only a small fraction of the input signal level. Thus, the baseline component may be removed at the front of the input amplifiers in the CDC to prevent overloading or saturation. FIGS. 2C and 2D depict the effect that removal of the baseline component has on the output of the CDC. For example, FIG. 2C has the same capacitance change at time A as that in FIG. 2A. However, in FIG. 2D, the change in the change in the number of counts perceived by the CDC is significantly larger. This is a result of removing the non-informative baseline portion of the signal received at the signal receiving channel.

Figure 3:
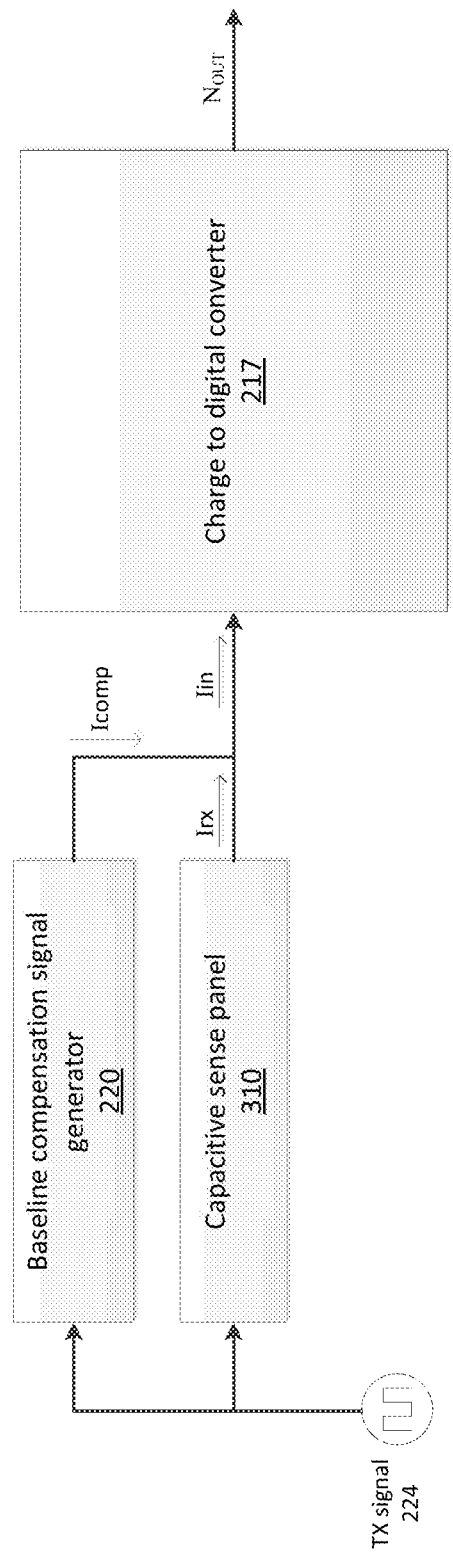
FIG. 3 is a block diagram illustrating a circuit providing a baseline compensation signal to a touch sensor receiver, according to an embodiment.

FIG. 3 depicts an example high level system diagram of a baseline compensation signal generator to remove a baseline signal from the signal received at a signal receiver channel. Compensation at the CDC input stage may reduce the net input current to the CDC input. Thus, lower current, smaller, and lower power elements may be used in the CDC. The baseline compensation signal generator 220 may provide a compensation signal to a signal receiver channel to remove a baseline signal component. In some embodiments, the TX signal 224 may be used to drive the compensation signal generator 220. However, the signal provided to the baseline compensation signal generator 220 may provide the compensation signal at an opposite phase of the TX signal 224. This may provide ratiometric compensation signals with similar noise as the transmission signal. Thus, the noise transmitted from TX driver through the capacitive sense panel 310 may be significantly reduced by the baseline compensation signal.

Figure 4:
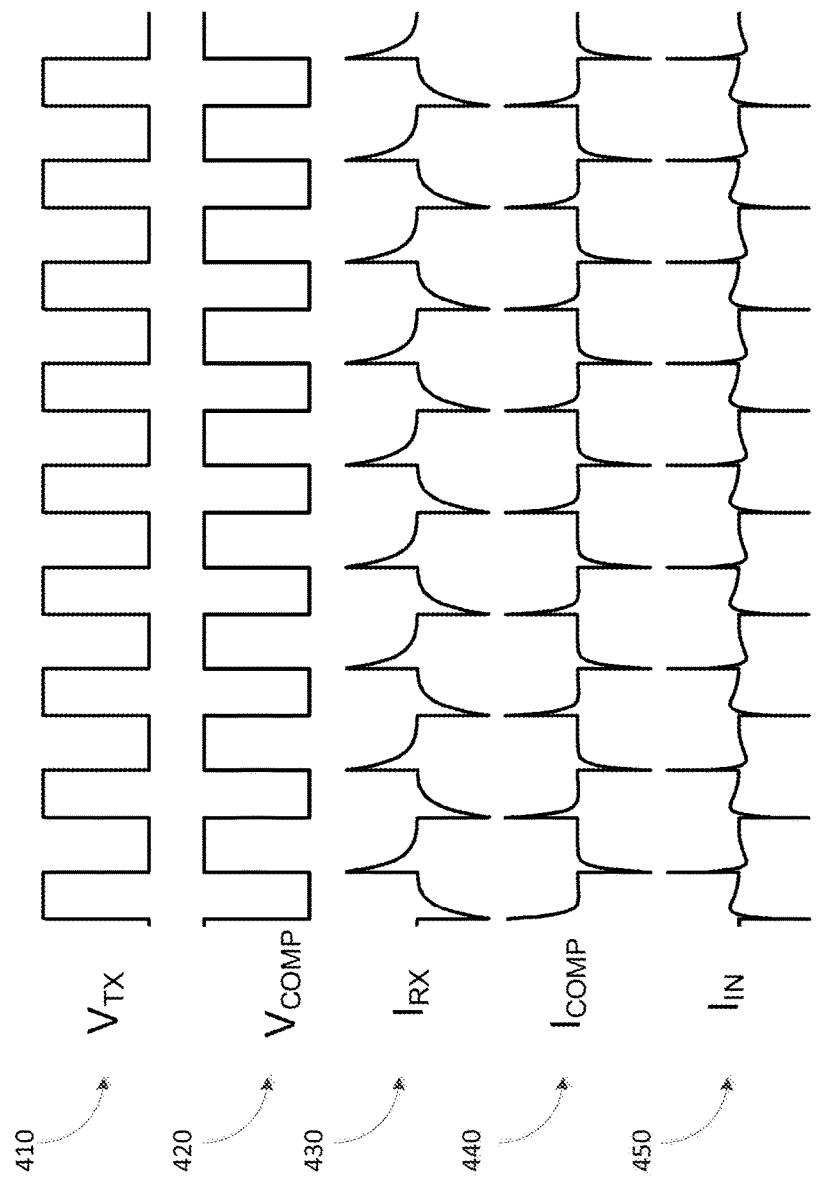
FIG. 4 is a diagram illustrating signal generated in an embodiment of a touch sensor.

FIG. 4 depicts an example of signals generated during operation of a capacitive sensing panel 310 with accompanying baseline compensation signal generator 220. As shown in FIG. 4, the transmission voltage ($V_{TX}$) 410 is provided as a square wave to the capacitive sense panel 310. The same transmission voltage may be provided to the baseline compensations signal generator 220. The baseline compensation signal generator 220 may then provide a compensation signal with the voltage ($V_{Comp}$) 420 that is an opposite phase compensation signal. For example, as shown in FIG. 4, the compensation signal 420 is a square wave 180 degrees out of phase with the transmission voltage 410.

The signal ($I_{RX}$) 430 received from the capacitive sense panel 310 is in phase with the transmission voltage 410. In order to remove the baseline signal from the received signal 430, the baseline compensation signal generator 220 provides a compensation signal ($I_{Comp}$) 440 to the received signal 430. The compensation signal 440 removes at least a portion of the baseline signal from the received signal 430. As is seen in FIG. 4, the baseline compensation signal 440 is provided in the opposite phase of the received signal 430. Thus, as current is received from the capacitive sense panel 310, a baseline portion of the signal may be removed by an opposite phase signal ($I_{COMP}$) 440 received from the baseline compensation signal generator 220.

As depicted in FIG. 4, the input signal ($I_{IN}$) 450 is the result of the combination of the signal 430 and the baseline compensation signal 440. The charge received by the charge to digital convertor 217 is the charge from the resulting input signal 450. As can be seen from FIG. 4, the charge provided by the input signal 450 is less than would be provided from reading the received signal 430 directly. Thus, the input components of the charge to digital converter 217 may be lower power or use higher gain components. In addition, the dynamic range of the charge to digital converter 217 may be fully used to determine the capacitance of elements of the capacitive sense panel 310.

Figure 5:
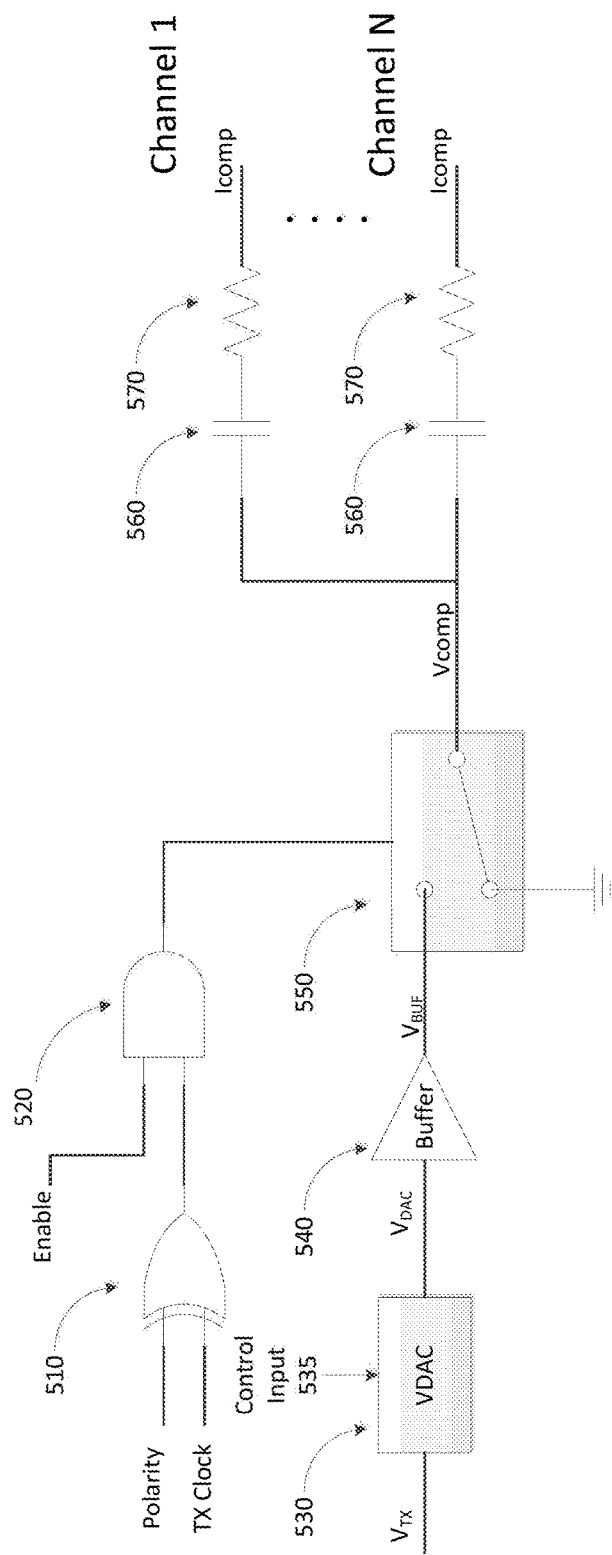
FIG. 5 is a block diagram illustrating a circuit providing a baseline compensation signal to a touch sensor receiver, according to an embodiment.

FIG. 5 depicts an example embodiment of a baseline compensation signal generator 220 for use with a capacitive sense panel. The example depicted in FIG. 5 provides a single compensation signal ($I_{Comp}$) to each of multiple signal receiver channels. This provides a compensation signal with reduced utilization of space on an integrated circuit, but does not provide compensation signals calibrated for individual receiver channels.

The example circuit in FIG. 5 receives the transmission voltage ($V_{TX}$) from a transmission signal generator. The transmission voltage may be received at a digital to analog converter (VDAC) 530 to produce an analog output signal ($V_{DAC}$). In some embodiments, the analog output voltage may be passed through a voltage buffer 540 to increase the power at which the VDAC may provide voltage to an RC circuit to generate the baseline compensation signal. The resulting buffered voltage ($V_{BUF}$) may be provided to the RC circuit through a switch 550. In some embodiments the VDAC 530 may be a multiplying digital to analog converter such that a control input 535 determines the voltage level provided by the VDAC. The control input may be set during a calibration performed by control elements of the capacitance sensor.

The switch 550 may be controlled by an "Enable" signal that determines when a compensation signal should be provided and a "Polarity" signal. The polarity signal and a clock signal for the transmission voltage may be provided to an 'exclusive or' gate 510 that controls the timing of the compensation signal output. For example, the polarity signal may ensure that the compensation signal is output in the opposite phase of the transmission voltage. The enable signal may be applied with the output of the 'exclusive or' gate to an 'and' gate 520 such that the switch 550 is only activated when the enable signal is applied to the circuit. The polarity control may be set during calibration of a capacitance sensor such that the phase is opposite of the transmission input. For example, a processing device may control the polarity such that the baseline compensation signal generator provides a compensation signal in the opposite phase of the received signal from a capacitive sense array. In some embodiments, such polarity control may be used for capacitive sensors having multiphase drive or sense sequences, to adjust the polarity of the compensation signal for multiphase sequences that may have different signs.

The switch then outputs the buffered voltage ($V_{BUF}$) to an RC circuit to provide a baseline compensation signal to each signal receiver channel. The RC circuit may include a baseline capacitor 560 and a current limiting resistor 570 for each signal receiver channel such that a baseline compensation signal ($I_{Comp}$) is provided in front of the charge to digital converter for each signal receiver channel. The baseline capacitor 560 and current limiting resistor 570 may have values such that the compensation signal is calibrated to be similar to a baseline component of a signal received from a capacitive sense array.

The charge provided by the baseline compensation signal may be determined by the voltage provided by the VDAC ($V_{DAC}$) multiplied by the baseline capacitor. As an equation: $Q_{Comp}=V_{DAC}C_B$, where $Q_{Comp}$ is the charge provided by baseline compensation signal $I_{Comp}$, $V_{DAC}$ is the voltage provided by the VDAC 530 and $C_B$ is the capacitance of baseline capacitor 560. Thus, when the baseline compensation signal is provided to in front of a charge to digital converter, a portion of a baseline charge $Q_{Baseline}$ may be removed from the signal in an amount equal to $Q_{Comp}$.

Figure 6:
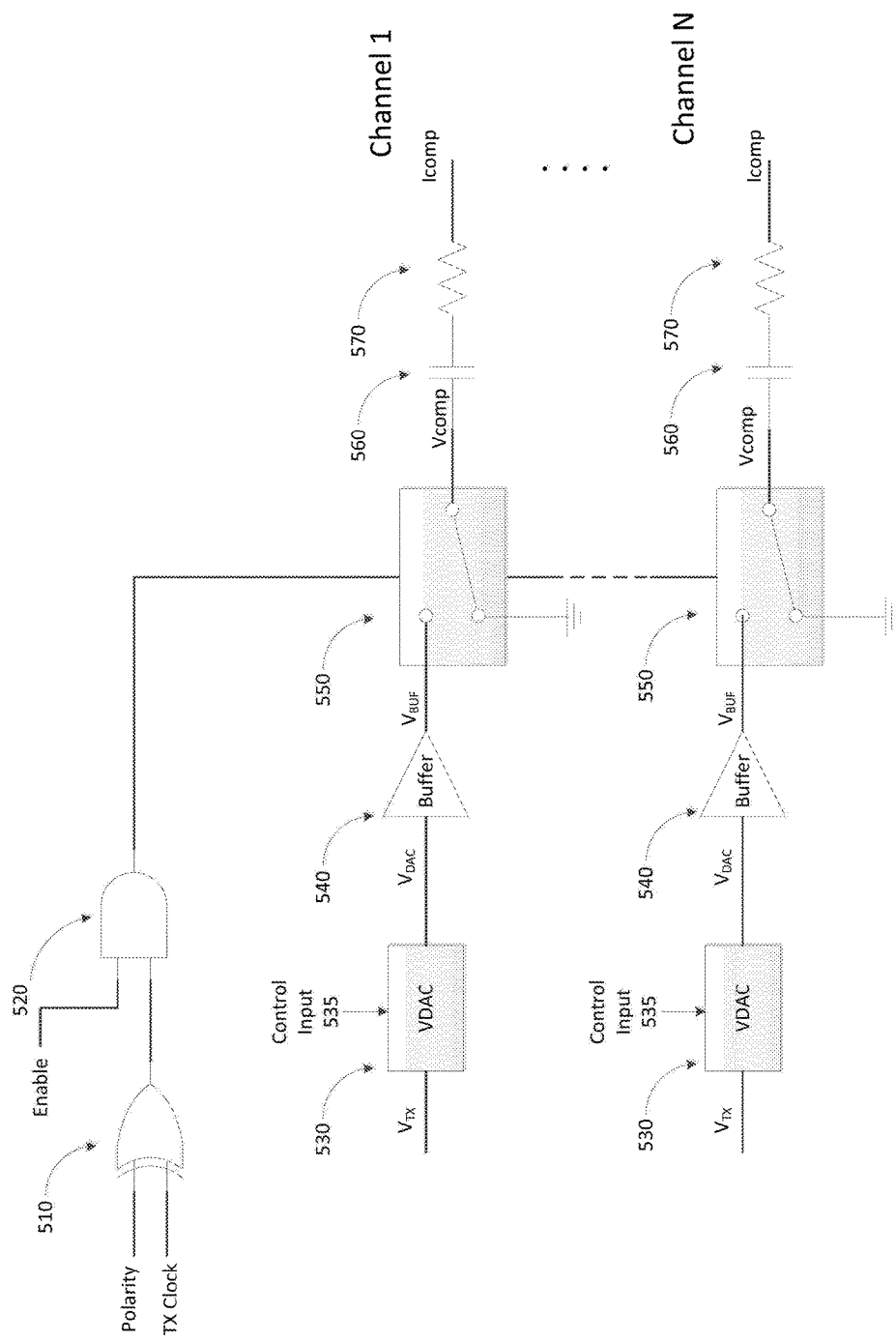
FIG. 6 is a block diagram illustrating a circuit providing a baseline compensation signal to a touch sensor receiver, according to an embodiment.

The example circuit illustrated in FIG. 5 adjusts compensation current by adjusting the voltage, coming from VDAC. The adjustment is made for each channel that is receiving the baseline compensation signal. In some embodiments, a baseline compensation signal generator may provide baseline compensation signal calibrated for individual signal receiver channels. For example, FIG. 6 depicts an example circuit that provides an individual baseline compensation signal generator for each signal receiver channel. The example in FIG. 6 has the advantage of providing compensation signals for each particular signal receiver channel, however, providing individual components for each signal receiver channel may utilize additional space on an integrated circuit and consume more power.

In the example circuit depicted in FIG. 6, each signal receiver channel (Channel 1-Channel N) has an individual VDAC 530, voltage buffer 540, and switch 550. The VDACs 530, voltage buffers 540, and switch 550 may operate the same or similar to those described with reference to FIG. 5. Each VDAC 530 may be individually calibrated by a processing device to provide a voltage $V_{DAC}$ that will provide a baseline compensation signal ($I_{Comp}$) that corresponds to a baseline portion of a signal received by the respective signal receiver channel.

Figure 7:
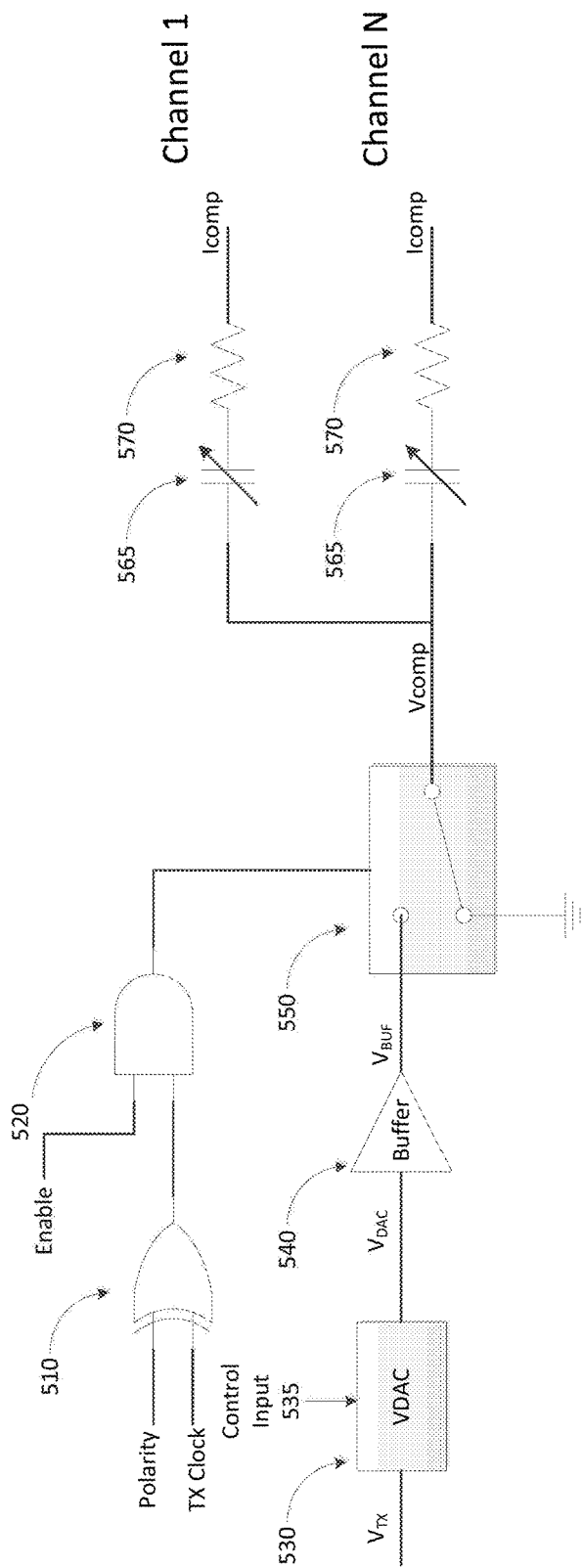
FIG. 7 is a block diagram illustrating a circuit providing a baseline compensation signal to a touch sensor receiver, according to an embodiment.

FIG. 7 depicts an example circuit that provides a baseline compensation signal individually calibrated for particular signal receiving channels while using a single VDAC 530 and voltage buffer 540. In the example circuit, the baseline compensation signal to each signal receiver channel is calibrated by variable baseline capacitors 565. Thus, according to the equation discussed above, the baseline compensation signal ($I_{Comp}$) provided to each signal receiver channel may remove a baseline portion of each received signal equal to $Q_{Comp}=V_{DAC}C_B$. Each signal receiver channel may have a particular baseline portion removed based on configuration of the capacitance of a respective baseline capacitor.

In some embodiments, the circuits illustrated in FIGS. 5-7 may be implemented without VDAC and voltage buffer components. Instead, the driving voltage provided to switch 550 may be provided by the transmission voltage ($V_{TX}$). The driving voltage may then be provided in an opposite phase to the signal receiving channels by a combination of a polarity control signal and the capacitance of the baseline capacitors.

Figure 8A:
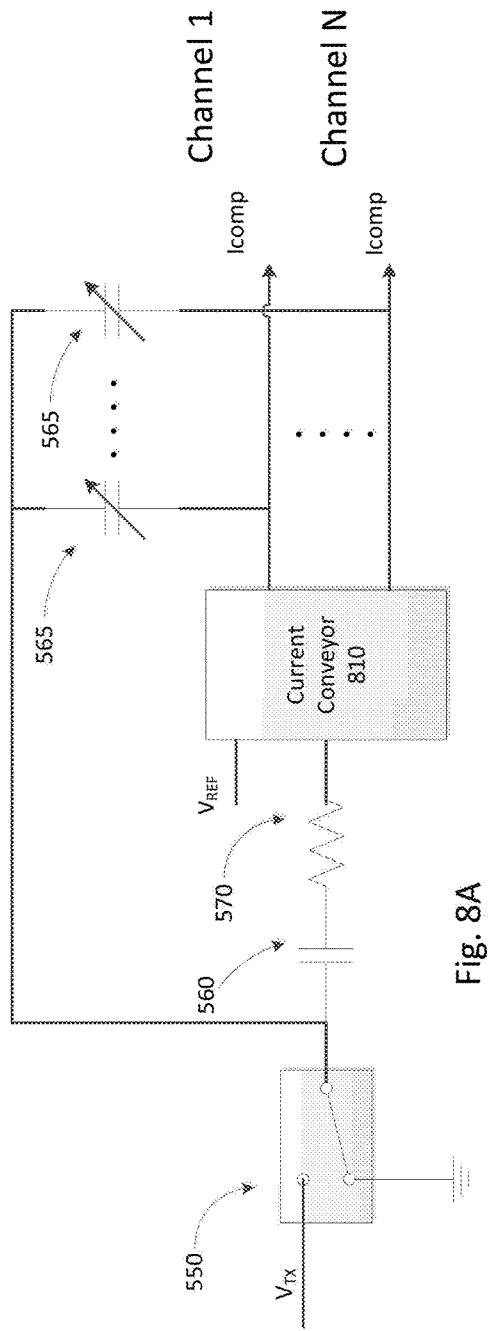
FIGS. 8A and 8B are block diagrams illustrating circuits for providing a baseline compensation signal to a touch sensor receiver, according to an embodiment.
Figure 8B:
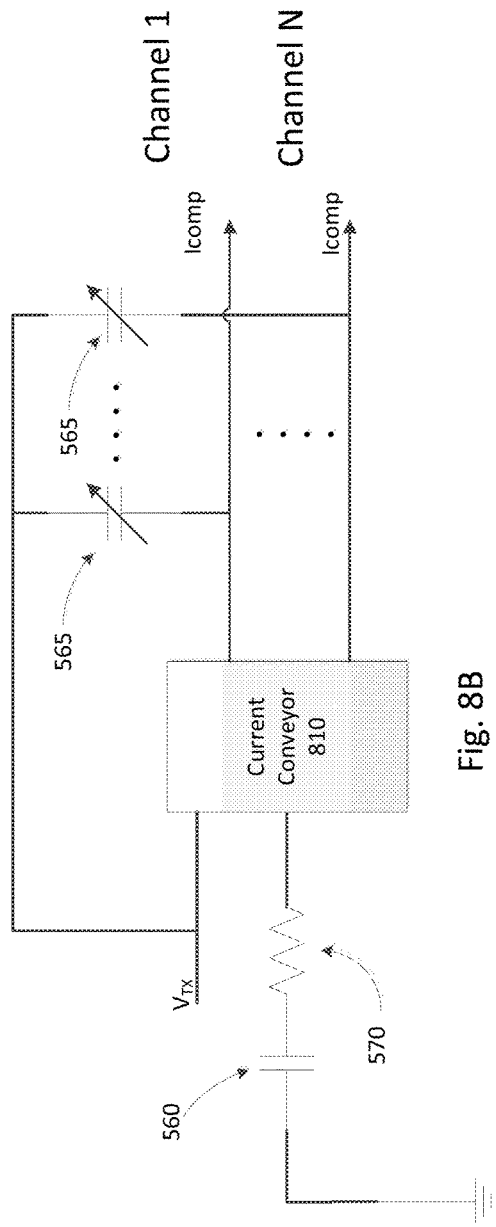

FIGS. 8A and 8B depict example circuits for providing a global baseline compensation current for a plurality of signal receiving channels and calibrating the global baseline compensation current for particular signal receiving channels. In the example circuits shown in FIGS. 8A and 8B a current source is used to generate a plurality of outputs to corresponding signal receiver channels. Then, individual variable capacitors 565 may be used to tune the baseline compensation signal. For example, in FIG. 8A, a switch 550 may be used to provide an input from the transmission voltage of a capacitive sense array to a baseline capacitor 560 and a current limiting resistor 570. The current supplied to current conveyor 810 may be used to provide a global baseline current compensation signal from the current conveyor 810 to each signal receiver channel. In addition, variable capacitors 565 may provide an additional baseline compensation signal to signal receiver channels.

FIG. 8B depicts another example implementation of a baseline compensation signal generator using a current conveyor to provide a global baseline compensation current to a plurality of signal receiver channels. The global compensation signal may be generated by a current limiting resistor 570 and a baseline capacitor 560 to generate an output current from a current conveyor 810 to a plurality of signal receiver channels. Each signal receiver channel may have a corresponding variable capacitor 565 that provides an additional baseline compensation signal to each signal receiver channel. The variable capacitors 565 may be configured based for characteristics of each particular signal receiver channel.

Figure 9:
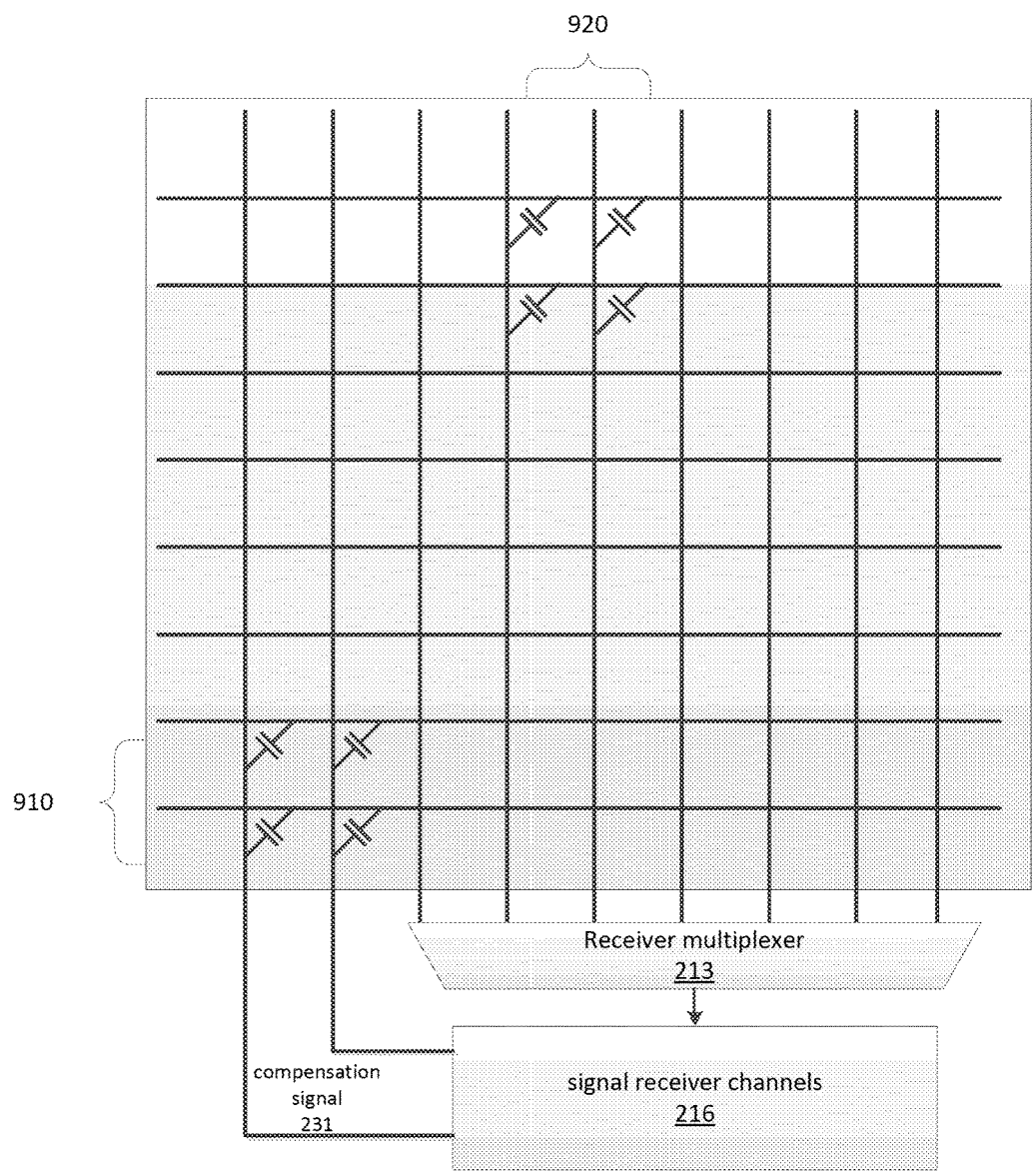
FIG. 9 is a block diagram illustrating circuitry to provide a baseline compensation signal to a touch sensor receiver, according to an embodiment.

In some embodiments, a fingerprint sensor may have mutual capacitances on the order of 1 fF or less. In the touch sense applications mutual capacitance might be less that 1 pf and vary from sense panel to panel. Particular capacitances in this range may be difficult or costly to reproduce on an integrated circuit. In some embodiments, such capacitances of a similar range to the elements of a capacitive sense array may be generated by using hidden 'dummy' capacitors in the capacitive sense array. For example, as shown in FIG. 9, one or more baseline capacitors may be generated using 'dummy' capacitors 910 of a capacitive sense array. The 'dummy' capacitors 910 may perform the function of any of the baseline capacitors or variable capacitors described herein. The capacitance of the 'dummy' capacitors 910 may be have a capacitance similar to the capacitive sense array capacitors 920 that are part of a capacitive sense array. In some embodiments, the 'dummy' capacitors 910 may be disposed on a capacitive sense array in a manner such that they are guarded from contact from a finger or other outside elements. For example, the 'dummy' capacitors 910 may be covered by a protective coating, buried in internal layers of the capacitive sense array, or otherwise protected from influence from touch or other outside sources. Using 'dummy' capacitors instead of capacitors on an integrated circuit separate from the capacitive sense panel may provide better matching with capacitive sense elements of the capacitive sense panel, as they are built using same material and process. Also, the temperature drifts may be closer to the capacitive sense elements than similar capacitors on a separate integrated circuit. This may reduce the frequency at which the baseline compensation signal generator may be calibrated during operation of the capacitive sensor. The dummy capacitors 910 may also be selectively activated to provide tuning or calibration of the compensation signal 231. For example, one or more of the dummy capacitors 910 may be activated, deactivated, or have its polarity changed in order to calibrate a compensation signal 231.

Figure 10:
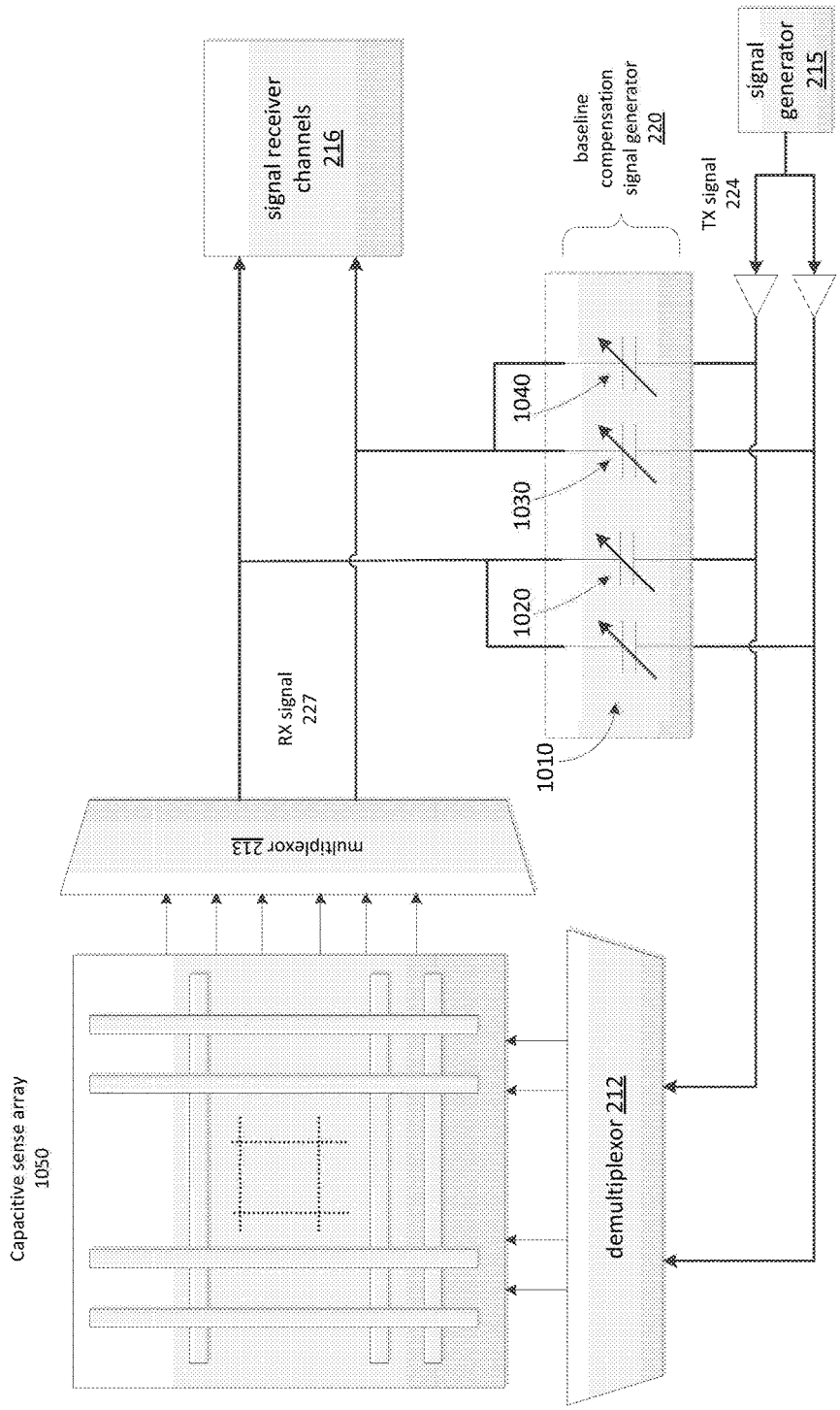
FIG. 10 is a block diagram illustrating a circuit providing a baseline compensation signal to a touch sensor receiver, according to an embodiment.

FIG. 10 depicts an example circuit that provides a baseline compensation signal for a capacitive sense array having a differential transmission inputs. The baseline compensation signal generator 220 provides a compensation signal in an opposite phase of an RX signal 227 that compensates for a baseline portion of the transmission signal (TX signal) 224 that is provided to the capacitive sense array 1050. For example, the positive terminal of a transmission signal 224 may be coupled through a baseline capacitance to a negative terminal of a received signal 227. In addition, the negative terminal of a transmission signal 224 may be coupled through a baseline capacitance to a positive terminal of a received signal 227. The compensation current by baseline capacitors 1010-1040 may be described by the equations $C_{NA}+C_{PA}=C_{NB}+C_{PB}$, $C_{NA}=C_{PB}$, and $C_{NB}=C_{PA}$, wherein, $C_{NA}$ is baseline capacitor 1010, $C_{PA}$ is baseline capacitor 1020, $C_{NB}$ is baseline capacitor 1030, and $C_{PB}$ is baseline capacitor 1040. In some embodiments, the baseline compensation signal generator 220 may also include one or more current limiting resistors not shown in FIG. 10. In addition, in some embodiments, a delta or gamma configuration of baseline capacitors may be used to provide a baseline capacitance signal in front of signal receiver channel 216. In some embodiments, the variable capacitors 1010-1040 may be calibrated to provide a baseline capacitance signal to signal receiver channels 216 to remove a baseline portion of signal 227.

Figure 11:
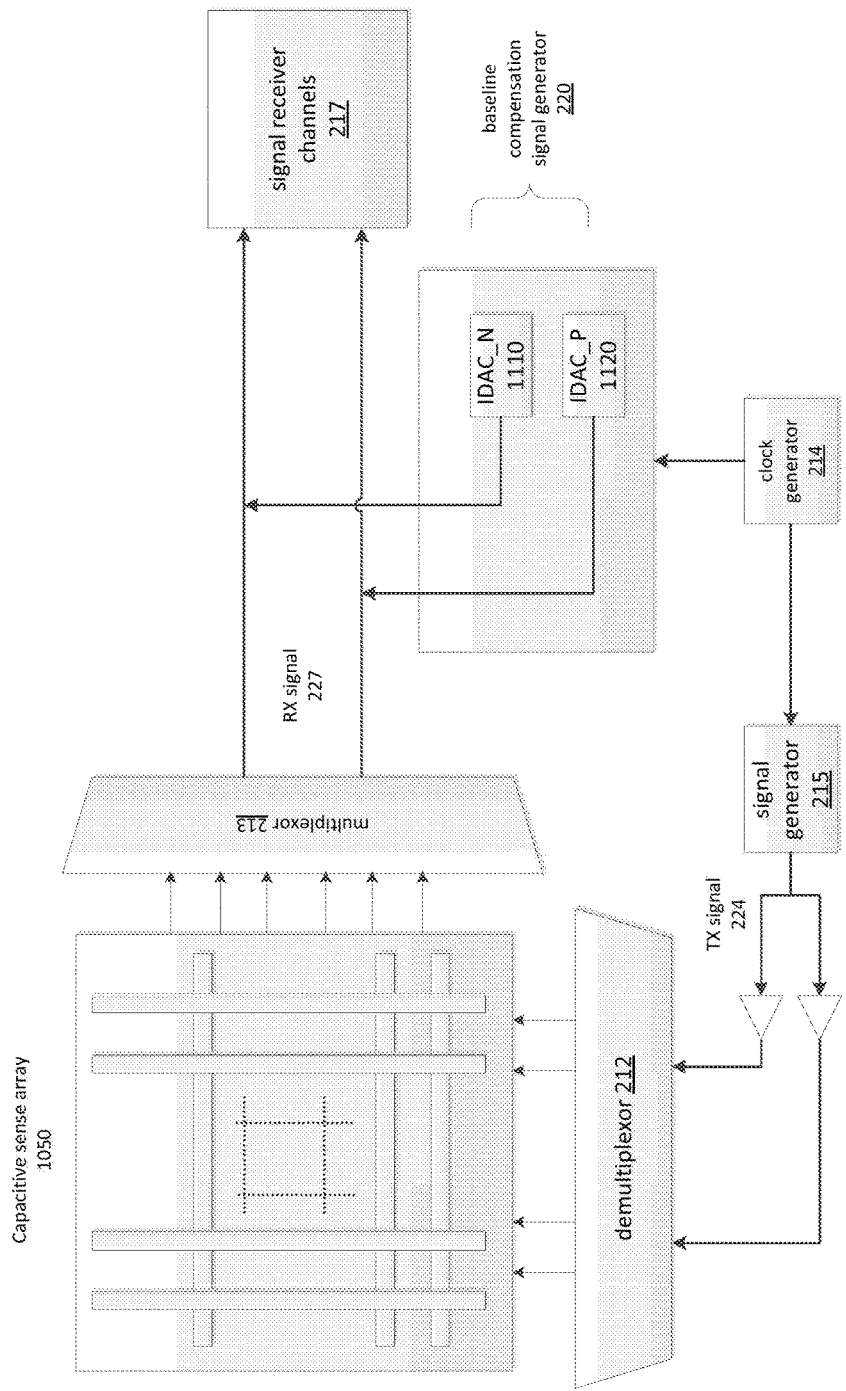
FIG. 11 is a block diagram illustrating a circuit providing a baseline compensation signal to a touch sensor receiver, according to an embodiment.

In some embodiments, the baseline compensation signal generator may comprise a current output digital to analog converter (IDAC). FIG. 11 depicts an example circuit comprising multiple IDACs utilized to provide a baseline compensation signal to a signal receiver channel in front of a charge to digital converter. The baseline compensation signal generator 220 may include an IDAC_N 1110 and an IDAC_P 1120, wherein the IDAC_N is provided in the opposite phase of a positive component of a received signal 227 and the IDAC_P is provided in the opposite phase of a negative component of a received signal 227. The current sources may provide AC compensation current that compensates the signal received from the capacitive sense array. The AC compensation signal may be synchronized with the TX frequency. For example, clock generator 214 may provide a clock signal to signal generator 215 and may also be coupled to the baseline compensation signal generator 220. For example, IDAC_N 1110 and IDAC_P 1120 may each be coupled to the clock generator 214. In some embodiments, the baseline compensation signal generator may be driven and/or synchronized by the TX signal 224 instead of or in addition to the clock generator 214. In some embodiments, the polarity of the compensation current of the IDACs is alternated using a pair of mixers. For example, the baseline compensation signal generator 220 may include one mixer per an inverting and non-inverting amplifier input. The compensation current provided by each IDAC may be configured by a firmware, software, or a hardware sequencer to set compensation current level automatically for each panel intersection.

Figure 12:
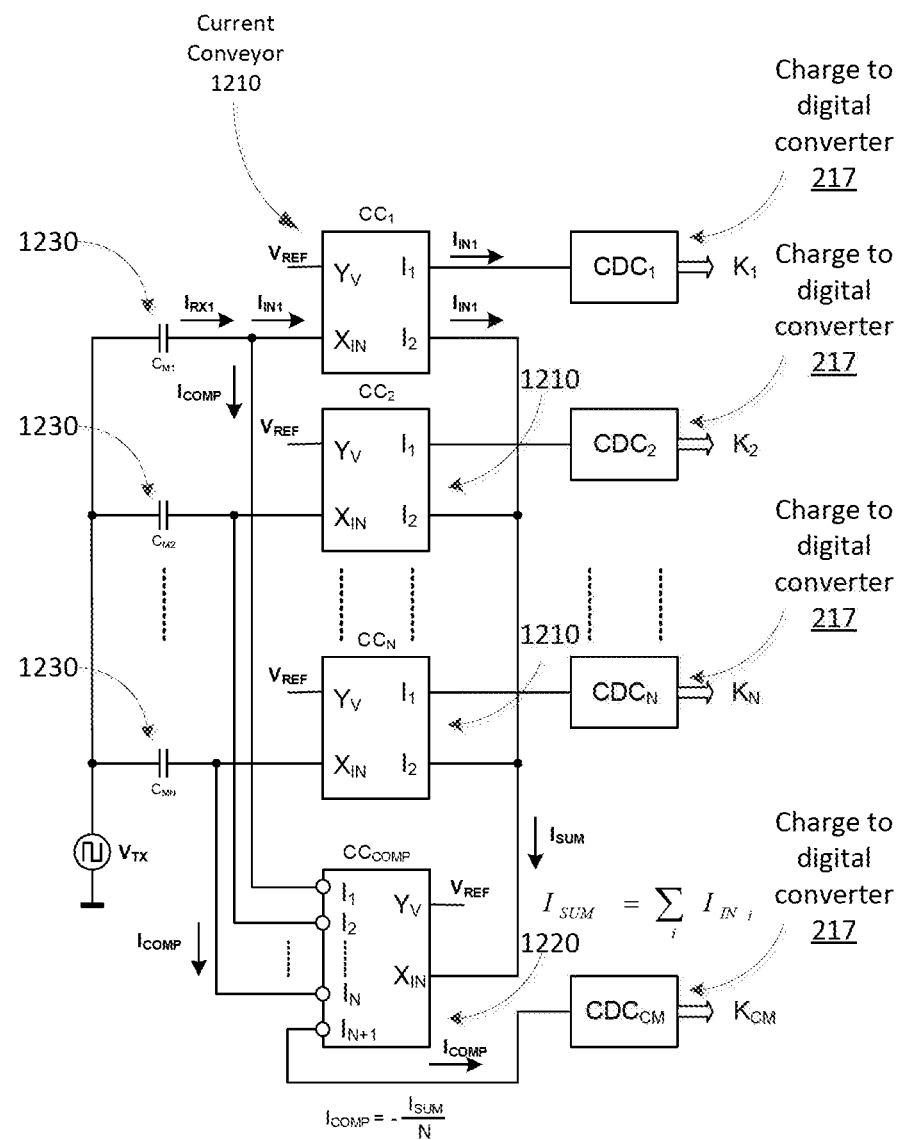
FIG. 12 is a block diagram illustrating a circuit providing a baseline compensation signal to a touch sensor receiver, according to an embodiment.

FIG. 12 depicts an example embodiment of a baseline compensation signal generator for a capacitive sense array, according to some embodiments. In the example shown in FIG. 12, the baseline compensation signal generator utilizes a current conveyor 1210 to generate a baseline compensation signal ($I_{COMP}$) 1220 that removes a common mode portion of a received signal. By removing a common mode portion of a received signal, the baseline compensation signal generator may provide a compensation signal without configuring baseline capacitors or other elements of the circuits. In touch sensor application, the baseline signal for the particular sensing electrodes is determined by the panel geometry and/or materials and is similar from channel to channel and the variation may be small compared to a baseline signal value. This fact allows removing the baseline from multiple parallel sensing channels by estimating the common mode signal across multiple channels and subtract same compensation value from all channels. Common mode signal is determined by the summing all signals altogether and dividing by the number of summed signals.

The baseline compensation signal generator circuit shown in FIG. 12 operates by providing a dual output current conveyor (CCII) 1210 for each signal receiving channel. For example, the dual output current conveyor may act as a current mirror to generate a current matching the input mirror to the dual output current conveyor 1210. The dual outputs of each current conveyor may provide the same value as each other. The first current output goes may be provided to a charge to digital converter 217, while the second current output may be provided as an input to a multiple input control current conveyor 1220. Thus, a common mode signal may be summed at the control current conveyor 1220 to generate a compensation signal. The compensation current from the control current conveyor 1220 provides a current in the opposite polarity as the input current, divides the sum of the common mode currents of each signal receiver channel, an provides the compensation signal to each of the elements ($C_{MN}$) 1230 of a capacitive sense array. The compensation current value is equal to the average value of the all input signals.

One advantage of the circuit shown in FIG. 12 is that tuning for the compensation circuit as it automatically determined and removes the common mode component from input signal. Furthermore, in some embodiments, the common mode component may be used for specific situations, such as when working with small area fingerprint sensors (e.g. 6.5 mm*6.5 mm). In addition, in some embodiments, the common mode signal may be removed when finger ridge and valley are parallel to TX lines, even when there are no signal change across RX lines array. For example, fingerprint ridges or valleys that are parallel to TX lines of a sensor array may not generate a signal change on the corresponding RX liens. Thus, as the common mode signal is removed, a circuit may not distinguish between parallel ridges or valleys of the fingerprint image. This may cause blurring in the image provided to higher level processing devices that may in turn cause incorrect match operations. For handling such situations the compensation current may be sensed using additional charge to digital converter and can be used as a baseline restoration at the host side compensate for potential blurring.

Figure 13:
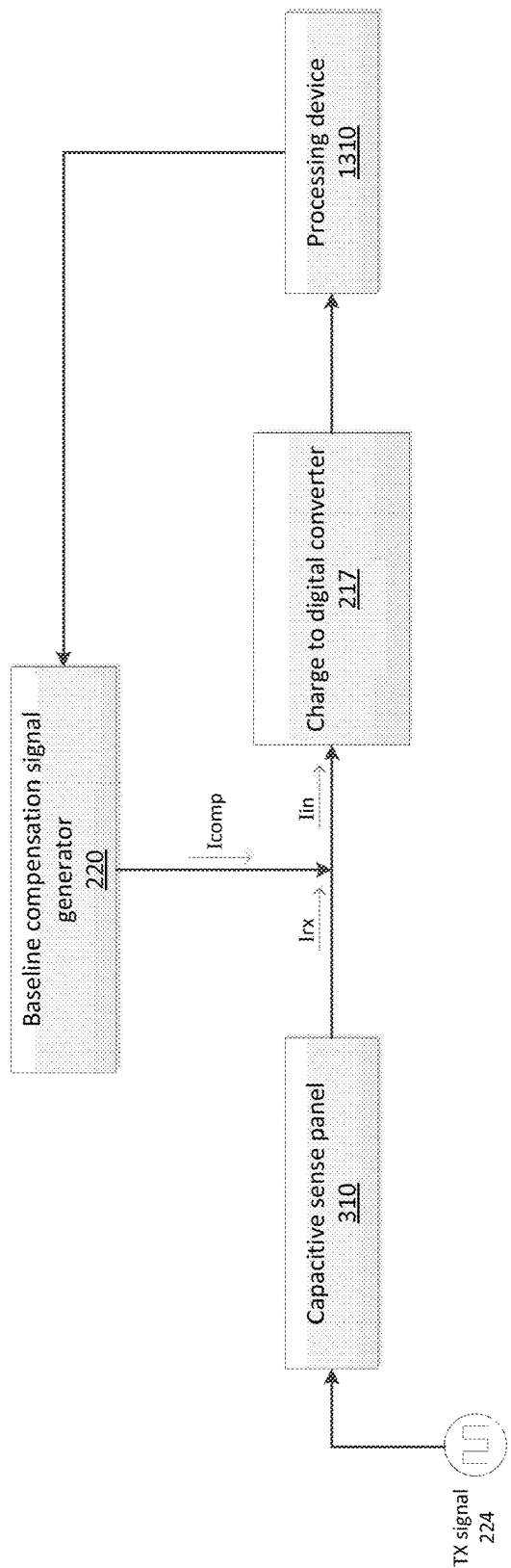
FIG. 13 is a block diagram illustrating a circuit providing a baseline compensation signal to a touch sensor receiver, according to an embodiment.

FIG. 13 depicts another example of a circuit for providing a baseline compensation signal to a signal received from a capacitive sense panel 310 in front of a charge to digital converter 217. A processing device 1310 calibrates a baseline compensation signal generator 220 in order to keep an input voltage ($I_{IN}$) to a charge to digital converter 217 within a range that optimizes the operation of input circuits of the charge to digital converter 217.

Figure 14B:
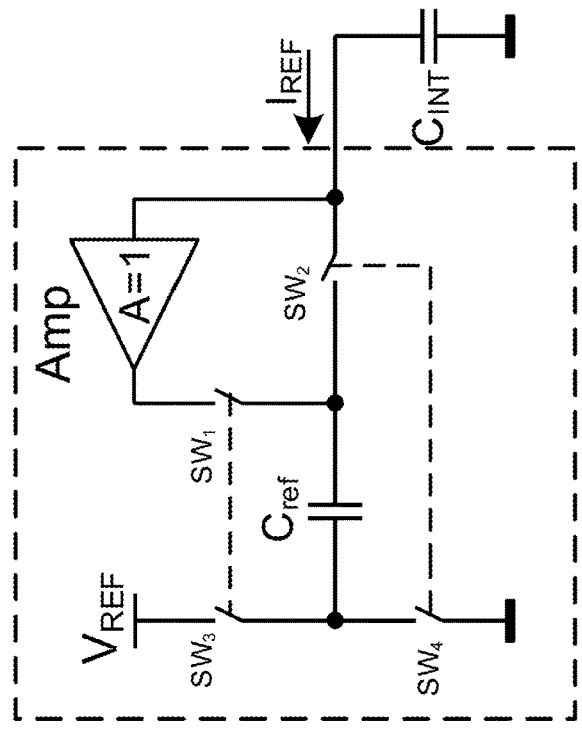
FIGS. 14A and 14B are block diagrams illustrating circuits for providing a baseline compensation signal to a touch sensor receiver, according to an embodiment.
Figure 14A:
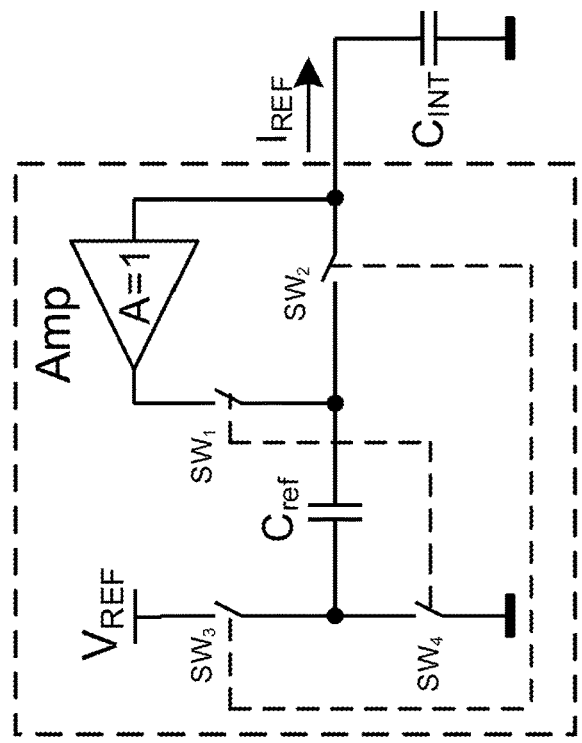

In order to reduce the noise inserted by the baseline compensation signal generator 220, the system may use a switching capacitor current source to provide the baseline compensation signal. FIGS. 14A and 14B illustrate two examples circuits that provide a baseline compensation signal to a charge to digital converter, according to an embodiments. The output current of the circuits shown in FIGS. 14A and 14B is given by the equations: $I_{REF}=V_{REF}f_{SQ}C_{REF}$ and $-I_{REF}=V_{REF}f_{SQ}C_{REF}$.

As may be seen from these equations, the switching capacitor current source can be controlled by a processing device by calibrating the reference voltage $V_{REF}$ and the operation frequency $f_{SW}$. In some embodiments, instead of having separate non-overlapped phases for the $SW_1$ and $SW_2$ switches, the delayed version of clock signal may be used to control such switches, and input switches $SW_3$ and $SW_4$ may be set in the proper state before current from $C_{REF}$ starts flowing.

In some embodiments, the polarity of the output compensation signal may be controlled by the polarity of switches $SW_1$ and $SW_2$. In some embodiments, the polarity of the output compensation signal may be controlled by the polarity of switches $SW_3$ and $SW_4$.

In some embodiments, the baseline compensation signal may be provided to compensate an input signal after demodulation of the signal. Such a demodulated input signal may be a pulsed single polarity current that has a non-zero component. The demodulated current may be compensated using single polarity current sources. The single polarity current sources may be switching capacitor current sources as described above. Accordingly, the current sources may provide limited flicker noise and the compensation signal may be proportional to the TX voltage. This may reduce the effects of transmission ripples at the receiver.

In some embodiments, this switching capacitor current source could be used for the baseline compensation current generation for the charge to digital converter. Also, this compensation source may generate additional current to bias raw counts to the desired value, when sensing capacitance is very low, so the baseline current is summed with sensor current thanking ability change polarity.

Figure 15:
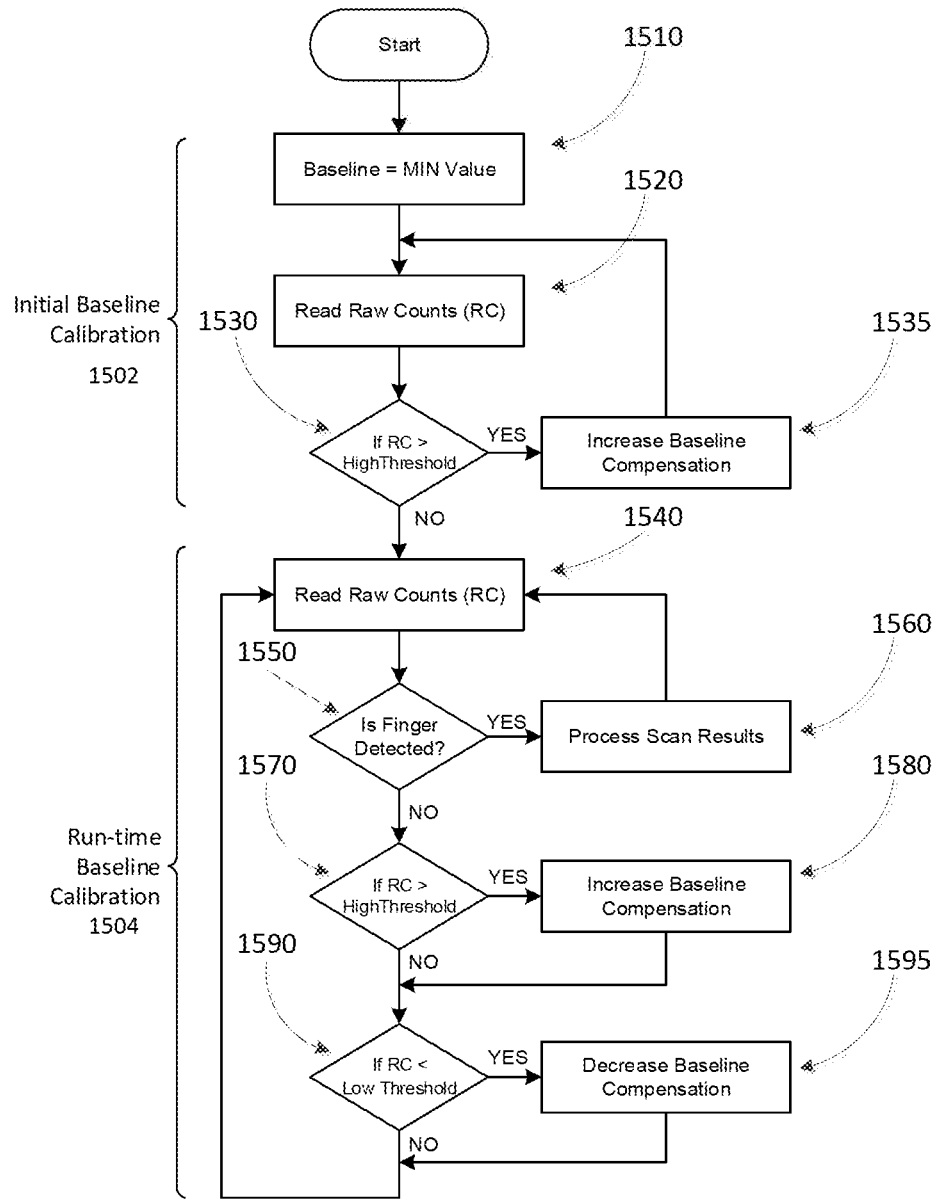
FIG. 15 is a flow diagram of processes of calibrating a baseline compensation signal generator, according to an embodiment.

FIG. 15 depicts a flow chart illustrating a process for calibrating a baseline compensation signal generator, according to an embodiment. Process depicted in portion 1502 of the flow chart may be performed as the touch screen device is powered on, while portion 1504 of the flow chart may be performed during operation of the touch screen device.

Beginning in block 1510, a processing device determines if a baseline value received from a capacitive sense array. The processing device may receive the baseline value directly from a charge to digital converter or after further processing by one or more other sensor components. Base on the reading from the capacitive sense array, the process moves on to block 1520 to determine a raw counts value for the capacitive sense array. Then in block 1530, the processing device determines if the output of the raw counts is over a threshold value. If the raw counts is over a threshold value the processing device may determine that the baseline compensation signal generated by a baseline compensation signal generator may be increased to reduce the raw counts received by the processing device. If the processing device determines that the raw counts value is over a threshold level, the processing device may increase the baseline compensation level in block 1535.

After the initial baseline compensation is set, the process continues by reading raw counts and determining touch or other characteristics of the capacitive touch sense. As the capacitive touch sensor operates, the process may continue to calibrate during run time. In block 1540, the processing device may determine a value of raw counts for an element of the capacitive sense array. Then, in block 1550, the processing device may determine if a touch is sensed by the capacitive sense array. If the capacitive sense array detects a touch in block 1550, the processing device proceeds to process the scan results in block 1560 to determine and/or responds to the touch.

If a finger touch is not detected, the process may continue to process calibrate the inputs to the charge to digital converter. In blocks 1570 and 1590 the processing device determines if the raw counts are too high or too low, respectively. If the raw counts are above a threshold value, the processing device may determine to increase baseline compensation in block 1580. If the raw counts are below a threshold value, the processing device may determine that is to decrease baseline compensation in block 1595.

Figure 16A:
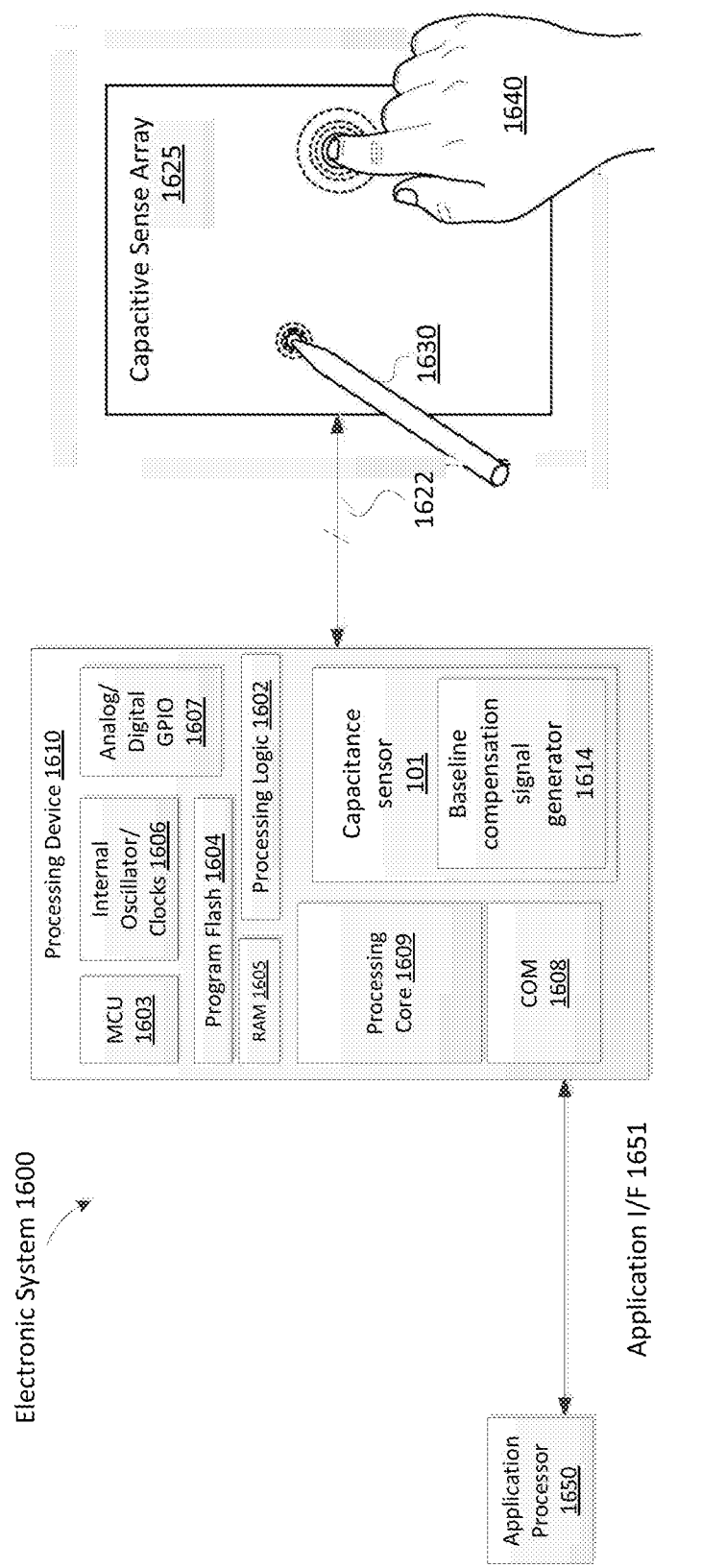
FIG. 16A is a block diagram illustrating an electronic system including a processing device and baseline compensation signal generator, according to an embodiment.

FIG. 16A is a block diagram illustrating an electronic system including a processing device and baseline compensation signal generator, according to an embodiment. Processing device 1610 may perform the same or similar functions as described with respect to capacitive sensor 101 of the above Figures, and vice versa. Capacitive sense array 1625 may include capacitive sense elements, as described above. In some embodiments, baseline compensation signal generator 1614 may be external to processing device 1610. The processing device 1610 is configured to detect one or more presences of a touch object detected proximate to a touch-sensing device, such as capacitive sense array 1625. The processing device 1610 may detect conductive objects, such as passive touch object 1640 (e.g., fingers and or passive stylus 1630, or any combination thereof). The processing device 1610 may measure touch data created by a presence of a touch object using the capacitive sense array 1625. The presence of a touch object may be detected by a single or multiple sensing cells, each cell representing an isolated sense element or an intersection of sense elements (e.g., electrodes) of the capacitive sense array 1625. In one embodiment, when the processing device 1610 measures a signal indicative of mutual capacitance of the touch-sensing device (e.g., using capacitive sense array 1625), the processing device 1610 acquires a 2D capacitive image of the touch-sensing object and processes the data for peaks and positional information. In another embodiment, the processing device 1610 is a microcontroller that obtains a capacitance touch signal data set from application processor 1650, and finger detection firmware executing on the microcontroller identifies data set areas that indicate touches, detects and processes peaks, calculates the coordinates, or any combination therefore. The microcontroller may report the precise coordinates to an application processor 1650, as well as other information. The application processor may include a host processor for a computer system that utilizes the capacitive sense array 1625. The host processor may include one or more processing devices, a memory, and other hardware or software components that perform operations for the electronic system 1600.

Electronic system 1600 includes processing device 1610, capacitive sense array 1625, passive stylus 1630, and application processor 1650. The capacitive sense array 1625 may include capacitive sense elements that are electrodes of conductive material, such as copper. The conductive material may painted or otherwise attached onto a substrate and or electrodes. The sense elements may also be part of an indium-tin-oxide (ITO) panel. The capacitive sense elements may be used to allow the processing device 1610 to measure self-capacitance, mutual capacitance, passive touch detection, other types of touch detection, or any combination thereof. In the depicted embodiment, the electronic system 1600 includes the capacitive sense array 1625 coupled to the processing device 1610 via bus 1622. The capacitive sense array 1625 may include a multi-dimension capacitive sense array. The multi-dimension sense array includes multiple sense elements, organized as rows and columns. In another embodiment, the capacitive sense array 1625 is non-transparent capacitive sense array (e.g., PC touchpad). The capacitive sense array 1625 may be disposed to have a flat surface profile. Alternatively, the capacitive sense array 1625 may have non-flat surface profiles. Alternatively, other configurations of capacitive sense arrays may be used. For example, instead of vertical columns and horizontal rows, the capacitive sense array 1625 may have a hexagon arrangement, or the like, as would be appreciated by one of ordinary skill in the art having the benefit of this disclosure. In one embodiment, the capacitive sense array 1625 may be included in an ITO panel or a touch screen panel.

The operations and configurations of the processing device 1610 and the capacitive sense array 1625 for detecting and tracking the passive touch object 1640 are described herein. In short, the processing device 1610 is configurable to detect a presence of the passive touch object 1640 on the capacitive sense array 1625.

In the depicted embodiment, the processing device 1610 includes analog and or digital general purpose input/output ("GPIO") ports 1607. GPIO ports 1607 may be programmable. GPIO ports 1607 may be coupled to a Programmable Interconnect and Logic ("PIL"), which acts as an interconnect between GPIO ports 1607 and a digital block array (not shown) of the processing device 1610. The digital block array may be configurable to implement a variety of digital logic circuits (e.g., DACs, digital filters, or digital control systems) using, in one embodiment, configurable user modules ("UMs"). The digital block array may be coupled to a system bus. Processing device 1610 may also include a memory device, such as random access memory ("RAM") 1605 and program flash 1604. RAM 1605 may be static RAM ("SRAM"), and program flash 1604 may be a non-volatile storage, which may be used to store firmware (e.g., control algorithms executable by processing core 1609 to implement operations described herein). Processing device 1610 may also include a memory controller unit ("MCU") 1603 coupled to memory and the processing core 1609. The processing core 1609 is a processing element configured to execute instructions or perform operations. The processing device 1610 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 1609. In the case of the memory being external to the processing device, the processing device is coupled to the other device in which the memory resides as would be appreciated by one of ordinary skill in the art having the benefit of this disclosure.

In one embodiment, the processing device 1610 further includes processing logic 1602. Some or all of the operations of the processing logic 1602 may be implemented in firmware, hardware, or software or some combination thereof. The processing logic 1602 may receive signals from the capacitive sense array 1625, such as whether an passive touch object 1640 (e.g., a finger) is detected on or in proximity to the capacitive sense array 1625 (e.g., determining the presence of the object), resolve where the passive touch object 1640 is on the sense array (e.g., determining the location of the passive touch object 1640), tracking the motion of the passive touch object 1640, or other information related to a passive touch object 1640 detected at the capacitance sensor.

The processing device 1610 may also include an analog block array (not shown) (e.g., field-programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO 1607.

As illustrated, low-power capacitance sensor 101 may be integrated into processing device 1610. Capacitance sensor 101 may include analog I/O for coupling to an external component, such as touch-sensor pad (not shown), capacitive sense array 1625, or other devices. The processing device 1610 may be configurable to measure a signal indicative of capacitance using mutual-capacitance touch detection techniques, self-capacitance touch detection techniques, passive touch detection techniques, charge-coupling techniques, charge balancing techniques, or the like. In one embodiment, processing device 1610 operates using a charge accumulation circuit, a capacitance modulation circuit, or other capacitance sensing methods known by those skilled in the art. In an embodiment, the processing device 1610 is of the Cypress TMA-3xx, TMA-4xx, or TMA-xx families of touch screen controllers. Alternatively, other capacitive sensing devices may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the transmission (TX) and receiving (RX) electrodes are configured in rows and columns, respectively. It should be noted that the rows and columns of electrodes may be configured as TX or RX electrodes by the processing device 1610 in any chosen combination. In one embodiment, the TX and RX electrodes of the sense array 1625 are configurable to operate as a TX and RX electrodes of a mutual capacitive sense array in a first mode to detect passive touch objects, and to operate as electrodes of a coupled-charge receiver in a second mode to detect a stylus on the same electrodes of the sense array. An intersection between two sense elements may be understood as a location at which one sense electrode crosses over or overlaps another, while maintaining galvanic isolation from each other. The capacitance associated with the intersection between a TX electrode and an RX electrode may be sensed by selecting every available combination of TX electrode and RX electrode. When a passive touch object 1640 approaches the capacitive sense array 1625, the object causes a decrease in mutual capacitance between some of the TX/RX electrodes. In another embodiment, the presence of a finger increases the capacitance of the electrodes to the environment (Earth) ground, typically referred to as self-capacitance change. Utilizing the change in mutual capacitance, the location of the finger on the capacitive sense array 1625 may be determined by identifying the RX electrode having a decreased coupling capacitance between the RX electrode and the TX electrode to which the TX signal was applied at the time the decreased capacitance was measured on the RX electrode. Therefore, by sequentially measuring signals to determine measurements representing the capacitances associated with the intersection of electrodes, the locations of one or more touch objects may be determined. It should be noted that the process may calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

Processing device 1610 and or capacitance sensor 101 may include internal oscillator/clocks 1606 and communication block ("COM") 1608. In another embodiment, the processing device 1610 includes a spread-spectrum clock (not shown). The oscillator/clocks block 1606 provides clock signals to one or more of the components of processing device 1610. Communication block 1608 may be used to communicate with an external component, such as an application processor 1650, via application interface ("I/F") line 1651.

Processing device 1610 and or capacitive sensor 101 may reside on a common carrier substrate such as, for example, an integrated circuit ("IC") die substrate, a multi-chip module substrate, or the like. Alternatively, the components of processing device 1610 may be one or more separate integrated circuits and/or discrete components. In one exemplary embodiment, processing device 1610 is the Programmable System on a Chip (PSoC®) processing device, developed by Cypress Semiconductor Corporation, San Jose, Calif. Alternatively, processing device 1610 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures a signal indicative of the capacitance on the sensing device and sends the raw data to a host computer where it is analyzed by an application. In effect, the processing that is done by processing device 1610 may also be done in the application processor.

Baseline compensation signal generator 1614 may be integrated into the IC of the processing device 1610, or alternatively, in a separate IC. Alternatively, descriptions of baseline compensation signal generator 1614, or relating to calibration of baseline compensation signal generator 1614, may be generated and compiled for incorporation into other integrated circuits. For example, behavioral level code describing parameters for calibration of baseline compensation signal generator 1614, or portions thereof, may be generated using a hardware descriptive language, such as VHDL or Verilog, and stored to a machine-accessible medium (e.g., CD-ROM, hard disk, floppy disk, etc.). Furthermore, the behavioral level code may be compiled into register transfer level ("RTL") code, a netlist, or even a circuit layout and stored to a machine-accessible medium. The behavioral level code, the RTL code, the netlist, and the circuit layout may represent various levels of abstraction to describe baseline compensation signal generator 1614.

Figure 16B:
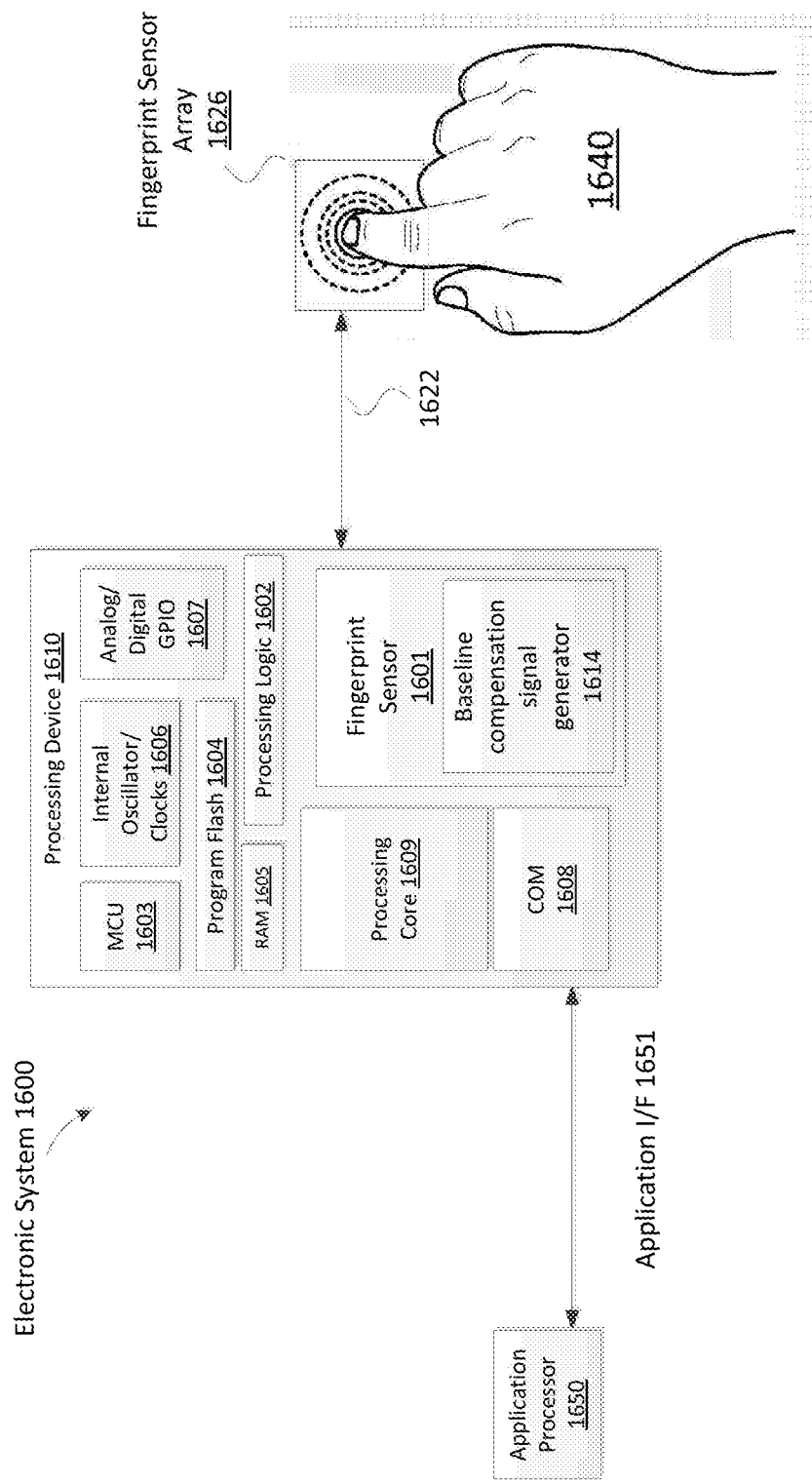
FIG. 16B is a block diagram illustrating an electronic system including a processing device and baseline compensation signal generator for a fingerprint sensor, according to an embodiment.

FIG. 16B is a block diagram illustrating an electronic system including a processing device and baseline compensation signal generator 1614, according to another embodiment. The electronic system 1600 illustrated in FIG. 16B may be similar to that illustrated in FIG. 16A, except that it may be designed to work with fingerprint sensor array 1626. The fingerprint sense array 1626 may be a particular capacitive sense array designed to detect a fingerprint. The fingerprint sense array 1626 may be approximately 6.5 mm by 6.5 mm in dimension and include capacitive sense elements on the order of one fF. In various embodiments, the fingerprint sense array 1626 may be larger or smaller and may include capacitive sense elements having other capacitances.

The additional components illustrated in FIG. 16B may be the same or similar to those shown in FIG. 16A. For example, the fingerprint sensor 1601 may be similar to capacitance sensor 101 and baseline compensation signal generator 1614 may be similar in FIGS. 16A and 16B. In some embodiments, the components in FIG. 16B may have different sizes or physical characteristics to match the characteristics of fingerprint sense array 1626. For example, baseline compensation signal generator 1614 may include a similar circuit in FIGS. 16A and 16B, however, the capacitance or resistance values of elements in the baseline compensation signal generator 1614 may be smaller in FIG. 16B than in FIG. 16A. Furthermore, various components shown in FIG. 16B may perform different processing. For example, processing core 1609 may perform different processing in FIG. 16A to detect the position of a touch compared to processing core 1609 in FIG. 16B to detect the fingerprint touching fingerprint sensor array 1626. The other components shown in FIG. 16B may be similar to the corresponding components in FIG. 16A with potentially different characteristics to compensate for the difference in signals from fingerprint sensor array 1626.

It should be noted that the components of electronic system 1600 illustrated in FIGS. 16A and 16B may include all the components described above. Alternatively, electronic system 1600 may include some of the components described above.

In one embodiment, the electronic system 1600 illustrated in FIGS. 16A and 16B is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and or video) player, a handheld gaming device, a signature input device for point of sale transactions, an eBook reader, global position system ("GPS") or a control panel. The embodiments described herein are not limited to touch screens or touch-sensor pads for notebook implementations, but may be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but may include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and or alternating manner. The terms "first," "second," "third," "fourth," etc. as used herein are meant as labels to distinguish among different elements and may not necessarily have an ordinal meaning according to their numerical designation. As used herein, the term "coupled" may mean connected directly or indirectly through one or more intervening components. Any of the signals provided over various buses described herein may be time multiplexed with other signals and provided over one or more common on-die buses. Additionally, the interconnection and interfaces between circuit components or blocks may be shown as buses or as single signal lines. Each of the buses may alternatively be one or more single signal lines and each of the single signal lines may alternatively be buses.

The above description sets forth numerous specific details such as examples of specific systems, components, methods, and so forth, in order to provide an understanding of several embodiments of the present invention. It may be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the claimed subject matter include, but are not limited to, various operations described herein. These operations may be performed by hardware components, software, firmware, or a combination thereof.

The above description sets forth numerous specific details such as examples of specific systems, components, methods, and so forth, in order to provide an understanding of several embodiments of the claimed subject matter. It may be apparent to one skilled in the art, however, that at least some embodiments of the may be practiced without these specific details. In other instances, well-known components or methods are not described in detail or are presented in simple block diagram format. Thus, the specific details set forth are merely exemplary. Particular implementations may vary from these exemplary details and still be contemplated to be within the scope of the claimed subject matter.

What is claimed is:

1. An apparatus comprising:
a signal generator to generate a transmission signal;
a baseline compensation signal generator coupled to the signal generator, the baseline compensation signal generator to:
    receive the transmission signal from the signal generator; and
    generate, using a resistor-capacitor (RC) circuit of the baseline compensation signal generator, a baseline compensation signal that is in an opposite phase of the transmission signal;
a signal receiver channel coupled to a capacitive sense array and the baseline compensation signal generator, the signal receiver channel being connected in series with the RC circuit, the signal receiver channel to:
    receive a receiving signal from the capacitive sense array and the baseline compensation signal from the baseline compensation signal generator; and
    generate a compensated receiving signal based on the receiving signal and the baseline compensation signal; and
a charge to digital converter, coupled to the signal receiver channel, the charge to digital converter to:
    receive the compensated receiving signal from the signal receiver channel; and
    convert the compensated receiving signal to digital code.

2. The apparatus of claim 1, wherein:
the signal generator is to provide the transmission signal to an element of the capacitive sense array,
the baseline compensation signal generator further comprises:
    a switch to apply the baseline compensation signal to the signal receiver channel in the opposite phase of the transmission signal.

3. The apparatus of claim 1, further comprising:
a second signal receiver channel to receive a second signal from the capacitive sense array; and
a second baseline compensation signal generator, coupled to the second signal receiver channel, to generate a second baseline compensation signal in an opposite phase of the second signal.

4. The apparatus of claim 1, further comprising:
a second signal receiver channel to receive a second signal from the capacitive sense array;
a first variable capacitor coupled to the baseline compensation signal generator and coupled to the signal receiver channel; and
a second variable capacitor coupled to the baseline compensation signal generator and coupled to the second signal receiver channel,
wherein the first variable capacitor and the second variable capacitor are independently adjustable.

5. The apparatus of claim 1, further comprising:
a second signal receiver channel to receive a second signal from the capacitive sense array;
a multiple output current conveyor coupled to the baseline compensation signal generator and having a first output and a second output, wherein the first output is coupled to the signal receiver channel and the second output is coupled to the second signal receiver channel;
a first variable capacitor coupled to the first output of the multiple output current conveyor; and a second variable capacitor coupled to the second output of the multiple output current conveyor.

6. The apparatus of claim 1, wherein the capacitive sense array comprises:
a first plurality of capacitive elements to generate a signal in response to an input; and
a second plurality of capacitive elements protected from the input, wherein the second plurality of capacitive elements generate the baseline compensation signal.

7. The apparatus of claim 1, wherein the baseline compensation signal generator comprises a plurality of capacitors coupled to the signal generator and to the signal receiver channel.

8. The apparatus of claim 1, wherein:
the signal receiver channel comprises a differential input; and
the baseline compensation signal generator comprises:
a first current source to provide the baseline compensation signal to a first input terminal of the differential input; and
a second current source to provide the baseline compensation signal to a second input terminal of the differential input.

9. The apparatus of claim 1, wherein:
the signal receiver channel comprises a first current conveyor to provide the receiving signal from the capacitive sense array to the charge to digital converter and mirror the receiving signal to a second current conveyor; and
the baseline compensation signal generator comprises the first current conveyor coupled to the second current conveyor.

10. The apparatus of claim 1, wherein the baseline compensation signal generator comprises a switching capacitor current source.

11. The apparatus of claim 10, wherein the switching capacitor current source is calibrated by a processing device.

12. The apparatus of claim 11, wherein the processing device calibrates the switching capacitor current source on power-up or in response to changes in operation during run-time.

13. The apparatus of claim 1, wherein the receiving signal received by the signal receiver channel is indicative of a fingerprint input to the capacitive sense array.

14. A system comprising:
a host processor;
a capacitive sense array; and
a processing device coupled to the host processor and the capacitive sense array, the processing device comprising:
a signal generator to generate a transmission signal;
a baseline compensation signal generator coupled to the signal generator, the baseline compensation signal generator to:
receive the transmission signal from the signal generator;
generate, using a resistor-capacitor (RC) circuit of the baseline compensation signal generator, a baseline compensation signal in an opposite phase of the transmission signal, wherein the baseline compensation signal is based at least in part on the transmission signal applied to the capacitive sense array;
a signal receiver channel coupled to a sensor array and the baseline compensation signal generator, the signal receiver channel being connected in series with the RC circuit, the signal receiver channel to:
receive a receiving signal from the sensor array and the baseline compensation signal from the baseline compensation signal generator; and
generate a compensated receiving signal based on the receiving signal and the baseline compensation signal; and
a charge to digital converter coupled to the signal receiver channel, the charge to digital converter to:
receive the compensated receiving signal from the capacitive sense array; and
convert the compensated receiving signal to digital code.

15. The system of claim 14, wherein the baseline compensation signal generator comprises a switch to selectively apply the baseline compensation signal, in the opposite phase of the transmission signal, through a current limiting circuit to the signal receiver channel.

16. The system of claim 14, further comprising:
a second signal receiver channel to receive a second signal from the capacitive sense array;
a multiple output current conveyor, coupled to the baseline compensation signal generator and having a first output and a second output, wherein the first output is coupled to the signal receiver channel and the second output is coupled to the second signal receiver channel;
a first variable capacitor coupled to the first output of the multiple output current conveyor; and
a second variable capacitor coupled to the second output of the multiple output current conveyor.

17. The system of claim 14, wherein the capacitive sense array comprises:
a first plurality of capacitive elements to generate a signal in response to the transmission signal; and
a second plurality of capacitive elements to generate an opposite phase average capacitance signal in response to the transmission signal,
wherein the capacitive sense array comprises a fingerprint sensor array.

18. The system of claim 14, wherein a transmission signal generator is coupled to the capacitive sense array, the transmission signal generator to provide the transmission signal comprising a differential input to the capacitive sense array, wherein the baseline compensation signal generator comprises a plurality of capacitors coupled to the transmission signal generator and to the signal receiver channel.

19. A method comprising:
providing, by a signal generator, a transmission signal to a capacitive sense array and a baseline compensation signal generator;
generating, by a compensation signal generator, a baseline compensation signal based at least in part on the transmission signal;
receiving, by a signal receiver channel, a receiving signal from the capacitive sense array;
injecting the baseline compensation signal onto the signal receiver channel through a resistor-capacitor circuit connected in series with the signal receiver channel to generate a compensated receiving signal based on the receiving signal and the baseline compensation signal; and
providing the compensated receiving signal as an input to a charge to digital converter.

20. The method of claim 19, wherein the signal received by the signal receiver channel is indicative of a fingerprint input to the capacitive sense array.

* * * * *